(12) United States Patent
Tanaka et al.

(10) Patent No.: US 11,846,702 B2
(45) Date of Patent: *Dec. 19, 2023

(54) IMAGE PROCESSING DEVICE AND IMAGE PROCESSING METHOD

(71) Applicant: NEC Corporation, Tokyo (JP)

(72) Inventors: Taichi Tanaka, Tokyo (JP); Osamu Hosyuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 17/627,211

(22) PCT Filed: Jul. 18, 2019

(86) PCT No.: PCT/JP2019/028264
§ 371 (c)(1),
(2) Date: Jan. 14, 2022

(87) PCT Pub. No.: WO2021/009904
PCT Pub. Date: Jan. 21, 2021

(65) Prior Publication Data
US 2022/0268922 A1    Aug. 25, 2022

(51) Int. Cl.
*G01S 13/90* (2006.01)
*G01S 7/28* (2006.01)

(52) U.S. Cl.
CPC ........ *G01S 13/9021* (2019.05); *G01S 7/2813* (2013.01); *G01S 13/9005* (2013.01)

(58) Field of Classification Search
CPC . G01S 13/9021; G01S 7/2813; G01S 13/9005
USPC ....................................................... 342/42
See application file for complete search history.

(56) References Cited

U.S. PATENT DOCUMENTS

| | | | | |
|---|---|---|---|---|
| 8,482,453 | B2* | 7/2013 | Costantini | G01S 13/9023 342/25 R |
| 10,255,689 | B2* | 4/2019 | Lee | H04N 23/57 |
| 10,366,475 | B2* | 7/2019 | Naruse | G06T 5/003 |
| 10,559,608 | B2* | 2/2020 | Okuno | H04N 25/702 |
| 10,868,985 | B2* | 12/2020 | Lin | H04N 25/683 |
| 11,107,251 | B2* | 8/2021 | Sato | H04N 19/40 |

(Continued)

FOREIGN PATENT DOCUMENTS

| | | | | |
|---|---|---|---|---|
| CN | 101738607 A | * | 6/2010 | ............... G01S 7/41 |
| CN | 103426175 A | * | 12/2013 | ........... G06K 9/0063 |
| CN | 103645476 A | * | 3/2014 | ........ G01S 13/9023 |
| CN | 103645476 A | | 3/2014 | |
| JP | 2006107220 A | * | 4/2006 | ............. G06F 13/00 |
| JP | 2011-211437 A | | 10/2011 | |
| JP | 2012-533051 A | | 12/2012 | |

(Continued)

OTHER PUBLICATIONS

International Search Report for PCT Application No. PCT/JP2019/028264, dated Aug. 20, 2019.

(Continued)

*Primary Examiner* — Nuzhat Pervin
(74) *Attorney, Agent, or Firm* — Sughrue Mion, PLLC

(57) ABSTRACT

The image processing device 10A includes phase specifying means 11 for specifying a phase of a sample pixel from a plurality of SAR images, clustering means 12 for generating a plurality of clusters by clustering the sample pixels based on correlation of phases of a pair of the sample pixels in the SAR image, and phase statistic data calculation means 13 for calculating phase statistic data capable of grasping a phase statistic regarding the pixel for each of the clusters.

16 Claims, 22 Drawing Sheets

(56) References Cited

U.S. PATENT DOCUMENTS

| | | | | |
|---|---|---|---|---|
| 2007/0164894 A1* | 7/2007 | Sherman | ............ | G01S 13/9011 |
| | | | | 342/25 F |
| 2011/0235934 A1* | 9/2011 | Takahashi | ............ | H04N 7/0145 |
| | | | | 382/254 |
| 2012/0013501 A1* | 1/2012 | Ferretti | ..................... | G06T 5/50 |
| | | | | 342/25 A |
| 2012/0019410 A1* | 1/2012 | Ferretti | ............... | G01S 13/9023 |
| | | | | 342/25 C |
| 2020/0096628 A1 | 3/2020 | Tanaka et al. | | |
| 2020/0346411 A1* | 11/2020 | Arad | ..................... | B29C 64/112 |
| 2020/0348411 A1 | 11/2020 | Tanaka et al. | | |
| 2021/0224510 A1* | 7/2021 | Pelkmans | ........... | G06F 18/2137 |

FOREIGN PATENT DOCUMENTS

| | | |
|---|---|---|
| WO | 2010/112426 A1 | 10/2010 |
| WO | 2011/003836 A1 | 1/2011 |
| WO | 2018/123748 A1 | 7/2018 |
| WO | 2019/106850 A1 | 6/2019 |

OTHER PUBLICATIONS

English translation of Written opinion for PCT Application No. PCT/JP2019/028264, dated Aug. 20, 2019.

A. Ferretti et. al., "A New Algorithm for Processing Interferometric Data-Stacks: SqueeSAR", IEEE Transactions on Geoscience and Remote Sensing, vol. 49, No. 9, pp. 3460-3470, Sep. 2011.

* cited by examiner

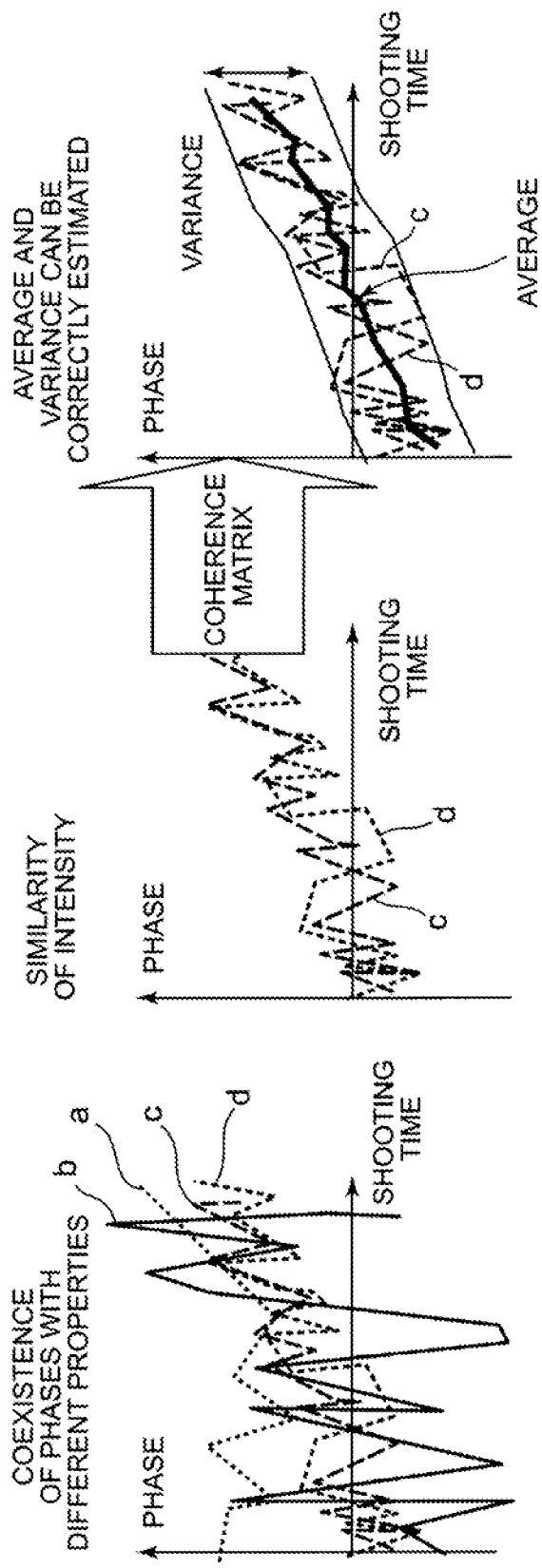

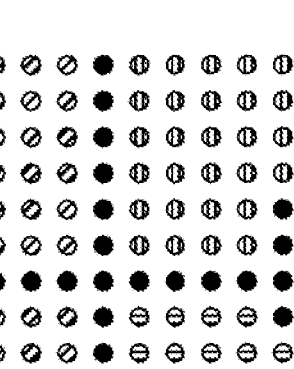
FIG. 14A
(PIXELS IN SAR IMAGE)
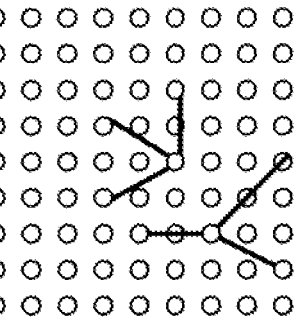
FIG. 14B
(VERIFY IDENTITY WITH NEIGHBORING PIXEL FOR EACH PIXEL)
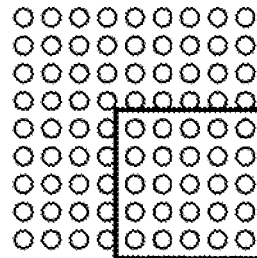
FIG. 14C
(CONNECT IDENTICAL PIXELS)
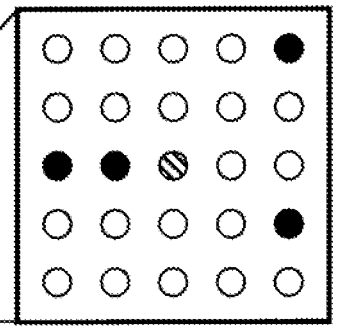
FIG. 14D
(CLUSTER BY CUTTING EDGES HAVING LOW PHASE CORRELATION)
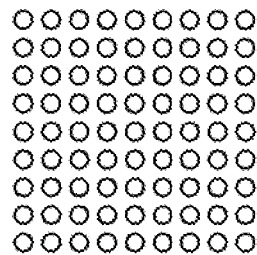
⊘ : CENTROID (SAMPLE PIXEL)
● : PIXEL WITH IDENTITY (SIMILAR PIXEL)

IMAGE PROCESSING DEVICE AND IMAGE PROCESSING METHOD

This application is a National Stage Entry of PCT/JP2019/028264 filed on Jul. 18, 2019, the contents of all of which are incorporated herein by reference, in their entirety.

TECHNICAL FIELD

The present invention relates to an image processing device and an image processing method for a synthetic aperture radar, which calculate data capable of grasping a phase statistic based on an interference image generated from a received electromagnetic wave of the synthetic aperture radar.

BACKGROUND ART

Synthetic aperture radar (SAR) technology is a technology which can obtain an image equivalent to the image by an antenna having a large aperture, when a flying object such as artificial satellite, aircraft, or the like transmits and receives a radio wave while the flying object moves. The synthetic aperture radar is utilized, for example, for analyzing an elevation or a ground surface deformation by signal-processing reflected waves from the ground surface.

When SAR technology is used, the analysis device takes time-series SAR images (SAR data) obtained by a synthetic aperture radar as input, and performs time-series analysis of the input SAR images.

Interferometric SAR analysis is an effective method for analyzing an elevation or a ground surface deformation. In the interferometric SAR analysis, the phase difference between radio signals of plural (for example, two) SAR images taken at different times is calculated. Then, a change in distance between the flying object and the ground that occurred during the shooting time period is detected.

Patent literature 1 describes an analysis method that uses a coherence matrix as data from which phase statistic can be grasped.

The coherence is calculated by complex correlation of pixels at the same position in plural SAR images among N (N≥2) SAR images. Suppose (m, n) is a pair of SAR images and cm, n are components of the coherence matrix. Respective m and n are less than or equal to N and indicate one of the N SAR images. The phase $\theta_{m,n}$ (specifically, the phase difference) is calculated for each pair of SAR images. Then, the values obtained by averaging $\exp(-j\theta_{m,n})$ for a plurality of pixels in a predetermined area including pixels to be calculated as coherence are components cm, n of the coherence matrix. In addition, $A_m \cdot A_n \cdot \exp(-j\theta_{m,n})$ may be averaged, where intensity in SAR image m is as $A_m$ and intensity in SAR image n is as $A_n$.

The angle $\angle c_{m,n}$ of $c_{m,n}$ corresponds to the average phase (specifically, the phase difference). The magnitude of the variance of the phase $\theta_{m,n}$ can be grasped from the absolute value of c, i.e., $\|c_{m,n}\|$.

The coherence matrix includes information that can be used to estimate the phase when the noise is removed. The coherence matrix also includes information that allows the degree of phase noise (i.e., variance) to be estimated.

The fact that phase $\theta_{m,n}$ is correlated with displacement velocity and shooting time difference is used for displacement analysis of the ground surface and other objects. For example, the displacement is estimated based on the average value of the phase difference. It is possible to verify the accuracy of the displacement analysis using the amount of phase noise. Thus, the coherence matrix can be used for the displacement analysis.

For elevation analysis, the fact that the phase $\theta_{m,n}$ correlates with the elevation of the object being analyzed and the distance between the flying objects (for example, the distance between two shooting positions of the flying objects) is used. For example, the elevation is estimated based on the average value of the phase difference. It is possible to verify the accuracy of the elevation analysis using the amount of phase noise. Thus, the coherence matrix can be used for the elevation analysis.

For example, when an interferometric SAR time series analysis is performed, PS (Persistent Scatterer) points are generally used as measurement points to ensure the analysis accuracy. However, when only PS points are used, the number of measurement points may be small. Therefore, for example, pixels whose statistical properties do not change much at multiple time points may also be used as measurement points.

Patent literature 2 describes a method for detecting pixels that are statistically homogeneous with a pixel.

In addition, non patent literature 1 describes an analysis method that utilizes a pixel called an SHP (Statistically Homogeneous Pixel), which is a pixel whose noise properties do not change between multiple time periods. As SHPs, pixels that have similarity in terms of intensity (reflection intensity) are selected.

CITATION LIST

Patent Literatures

PTL 1: International Publication No. 2011/003836
PTL 2: International Publication No. 2010/112426

Non Patent Literatures

NPL 1: A. Ferretti et. al., "A New Algorithm for Processing Interferometric Data-Stacks: SqueeSAR", IEEE Transactions on Geoscience and Remote Sensing, Vol. 49, No. 9, pp. 3460-3470, September 2011

SUMMARY OF INVENTION

Technical Problem

As mentioned above, $\angle c_{m,n}$ of the components $c_{m,n}$ of the coherence matrix corresponds to an average of phase $\theta_{m,n}$. In addition, $\|c_{m,n}\|$ of $c_{m,n}$ corresponds to the variance of the phase $\theta_{m,n}$. When the coherence matrix is calculated, if pixels with different properties of an average and a variance are mixed, the calculated coherence matrix will be inaccurate.

In the methods described in patent literature 2 and non patent literature 1, a statistically homogeneous pixel is utilized for a certain pixel, but whether the pixel is statistically homogeneous or not is determined based on the amplitude value or intensity of the pixel. Therefore, if the coherence matrix is calculated using the determined pixels (for example, SHP), an inaccurate coherence matrix may be generated. This is because the plurality of pixels used to calculate the coherence matrix may include pixels with different average and variance properties. As a result, when displacement analysis or elevation analysis is performed based on the coherence matrix, the reliability of the analysis may be reduced.

It is an object of the present invention to provide an image processing device and an image processing method capable of improving the accuracy of data from which phase statistic can be grasped.

Solution to Problem

An image processing device according to the present invention includes phase specifying means for specifying a phase of a sample pixel from a plurality of SAR images, clustering means for generating a plurality of clusters by clustering the sample pixels based on correlation of phases of a pair of the sample pixels in the SAR image, and phase statistic data calculation means for calculating phase statistic data capable of grasping a phase statistic regarding the pixel for each of the clusters.

An image processing method according to the present invention includes specifying a phase of a sample pixel from a plurality of SAR images, generating a plurality of clusters by clustering the sample pixels based on correlation of phases of a pair of the sample pixels in the SAR image, and calculating phase statistic data capable of grasping a phase statistic regarding the pixel for each of the clusters.

An image processing program according to the present invention causes a computer to execute a process of specifying a phase of a sample pixel from a plurality of SAR images, a process of generating a plurality of clusters by clustering the sample pixels based on correlation of phases of a pair of the sample pixels in the SAR image, and a process of calculating phase statistic data capable of grasping a phase statistic regarding the pixel for each of the clusters.

Advantageous Effects of Invention

According to the present invention, the accuracy of the data from which the phase statistic can be known is improved.

BRIEF DESCRIPTION OF DRAWINGS

FIG. 7A It depicts an explanatory diagram for explaining a result of the coherence matrix calculation.

FIG. 7B It depicts an explanatory diagram for explaining a result of the coherence matrix calculation.

FIG. 14 It depicts an explanatory diagram for explaining an action of the pixel connection unit.

EXAMPLE EMBODIMENTS

Hereinafter, example embodiments of the present invention will be described with reference to the drawings.

Example Embodiment 1

Figure 1:
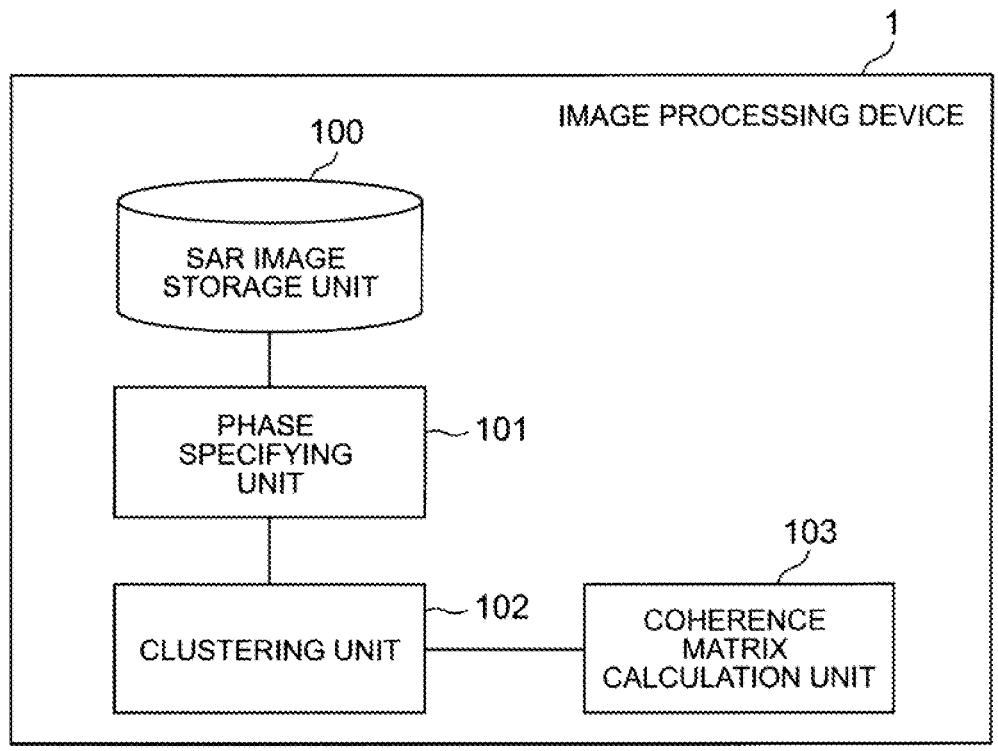
FIG. 1 It depicts a block diagram showing a configuration example of an image processing device of the first example embodiment.

FIG. 1 is a block diagram showing an example configuration of an image processing device of the first example embodiment. The image processing device 1 shown in FIG. 1 includes a SAR image storage unit 100, a phase specifying unit 101, a clustering unit 102, and a coherence matrix calculation unit 103.

N pieces of SAR images are stored in the SAR image storage unit 100. The phase specifying unit 101 specifies a phase in each of a plurality of sample pixels (target pixels) based on the plurality of SAR images. The clustering unit 102 clusters the sample pixels based at least on the correlation of the phases of the sample pixels.

The coherence matrix calculator 103 calculates a coherence matrix of the sample pixel using the phases of the pixels in the cluster.

Figure 2:
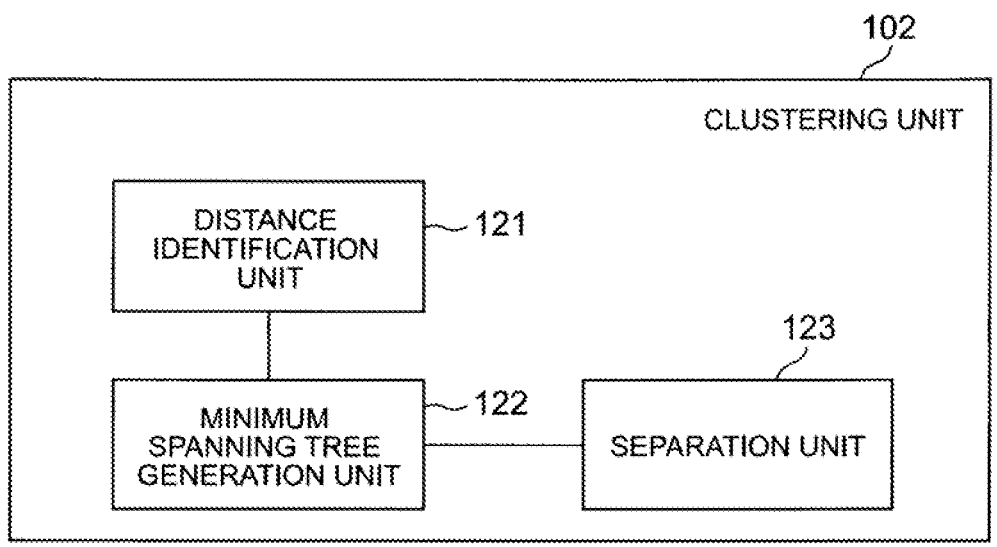
FIG. 2 It depicts a block diagram showing a configuration example of a clustering unit.

FIG. 2 is a block diagram showing an example configuration of the clustering unit 102. In the example shown in FIG. 2, the clustering unit 102 includes a distance identification unit 121, a minimum spanning tree generation unit 122, and a separation unit 123.

The distance identification unit 121 calculates a distance indicating a relationship between the two sample pixels based on a distance between the two sample pixels (for example, Euclidean distance) and a correlation of phases of the two sample pixels. The minimum spanning tree generation unit 122 generates a minimum spanning tree for the sample pixels based on the distance calculated in the distance identification unit 121. The separation unit 123 separates the minimum spanning tree using a predetermined threshold value. A set of sample pixels belonging to the separated and generated tree becomes a cluster of sample pixels. In general, multiple clusters are generated. In the following, the case where the Euclidean distance is used as the distance between pixels in an image is used as an example, but the distance is not limited thereto.

Figure 3:
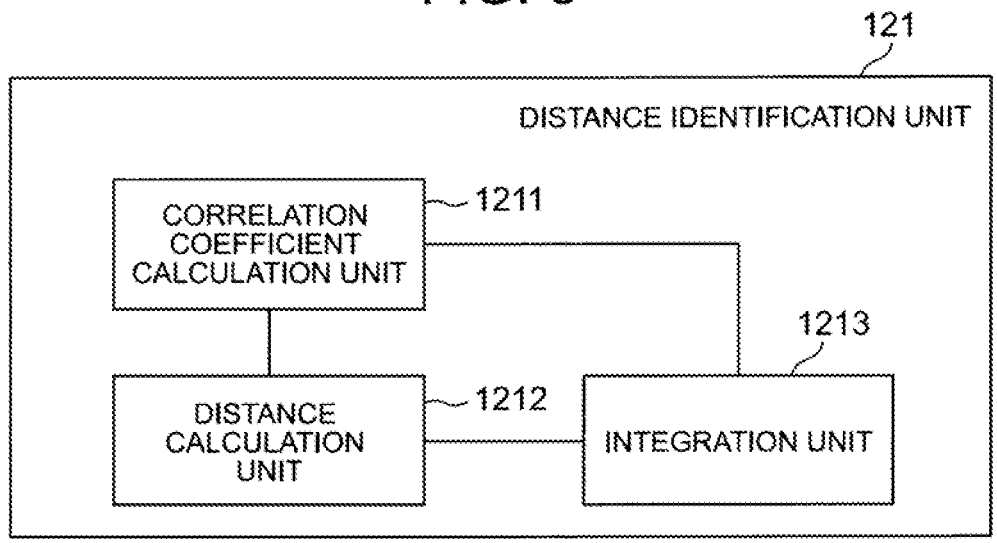
FIG. 3 It depicts a block diagram showing a configuration example of a distance identification unit.

FIG. 3 is a block diagram showing an example configuration of the distance identification unit 121. The distance identification unit 121 includes a correlation coefficient calculation unit 1211, a distance calculation unit 1212, and an integration unit 1213.

The correlation coefficient calculation unit 1211 calculates a correlation coefficient for the phase specifies by the phase specifying unit 101 with respect to the two sample pixels. The correlation coefficient calculation unit 1211 calculates a correlation coefficient for a phase (for example, each in a phase array) with respect to the two sample pixels.

The correlation coefficient calculation unit 1211, for example, performs the calculation on the correlation of the phase in the following manner. That is, when the phase specifying unit 101 specifies the phase as a complex number with an absolute value of 1, the correlation coefficient calculation unit 1211 may calculate the intensity of the correlation of the phase using the following formula (1). In the formula (1), each element of the phase array for the sample pixel a calculated by the phase specifying unit 101 is set to $s_{an}$, and each element of the phase array for the sample pixel b is set to $s_{bn}$. N indicates a number of images. n indicates a number (No.) of images. The superscript line represents the complex conjugate.

[Math. 1]
$$\left| \frac{\sum_n s_{an} \overline{s}_{bn}}{N} \right| \quad (1)$$

When the phase specifying unit 101 specifies the phase in the form of an angle, the correlation coefficient calculation unit 1211 may use Pearson product-moment correlation coefficient as the correlation coefficient of the phase.

The distance calculation unit 1212 calculates the Euclidean distance for two sample pixels. The distance calculation unit 1212 obtains the Euclidean distance in the SAR image by using the positional information such as the coordinates of the two sample pixels, using a known method or the like.

The integration unit 1213 determines a relationship between the two sample pixels based on the correlation coefficient for the two sample pixels calculated by the correlation coefficient calculation unit 1211 and the Euclidean distance for the two sample pixels calculated by the distance calculation unit 1212. The relationship is expressed as a distance. The distance between the two sample pixels is a small value when the correlation between the two sample pixels is strong. However, the correlation coefficient generally becomes a large value when the correlation is strong. Therefore, the integration unit 1213 may be provided with a conversion unit. The conversion unit converts the correlation coefficient, which is a large value when the correlation is strong, to be a small value when the correlation is strong.

The distance can be an indicator of the degree of relationship between the two sample pixels, and the integration unit 1213 may obtain the distance by a process different from the process described above.

In addition, the integration unit 1213 may obtain the distance by assigning a weight to at least one of the correlation coefficient and the Euclidean distance, for example. In the case where the weight is used, a distance is obtained that strongly reflects the one to be emphasized among the correlation coefficient and the Euclidean distance. For example, if a weight of 0 is assigned to the Euclidean distance, a distance based only on the correlation coefficient of the phase is calculated.

Figure 4:
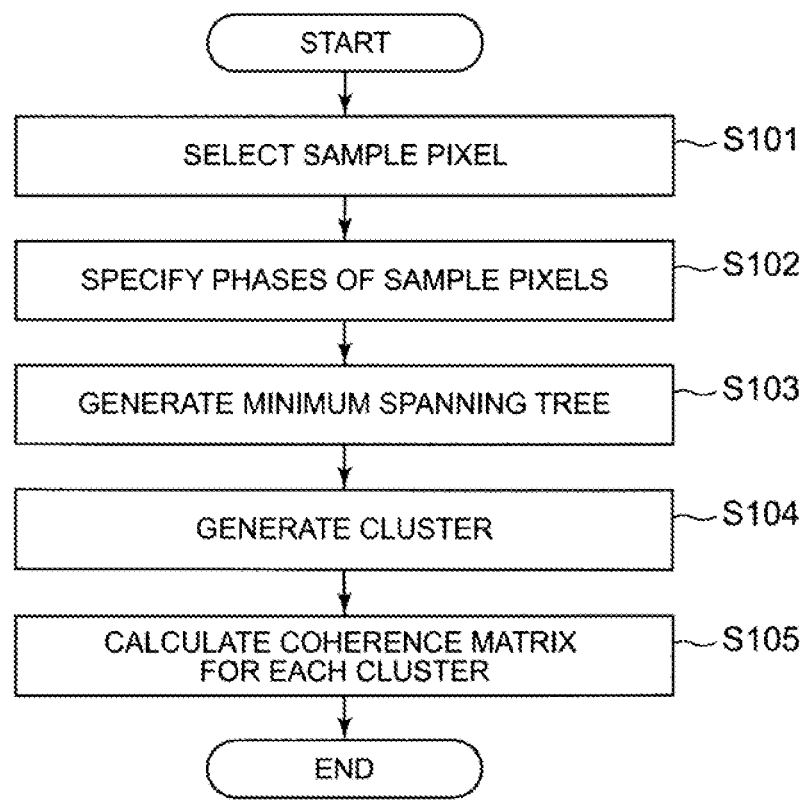
FIG. 4 It depicts a flowchart showing an example of an operation of an image processing device of the first example embodiment.

Next, the operation of the image processing device 1 will be described with reference to the flowcharts of FIGS. 4 and 5. FIG. 4 is a flowchart showing the operation of the image processing device 1.

The phase specifying unit 101 selects a sample pixel in the SAR image (step S101). The sample pixels may be PS point pixels, or PS point pixels and SHPs.

The phase specifying unit 101 specifies a phase in each of the sample pixels (step S102). The phase specifying unit 101 specifies the phase, for example, by making a phase array. Specifically, the phase specifying unit 101 makes, for each sample pixel, an array in which the phase at that pixel of each of the plurality of SAR images is an element, i.e., a phase array.

The phase specifying unit 101 may determine a change in phase (phase difference) between the reference SAR image and other SAR images, as an example of the phase at the sample pixel. In this case, the reference SAR image is predetermined among a plurality of SAR images taken of the same area. Then, the phase specifying unit 101 uses the phase difference as an element of the phase array. As another example, the phase specifying unit 101 may make a phase array by arranging the phases of the relevant pixels in the plurality of SAR images in chronological order or the like, without defining a reference SAR image.

The phase is expressed in the form of a complex number normalized so that the absolute value is 1, for example.

In this example embodiment, in the clustering unit 102, the minimum spanning tree generation unit 122 generates a minimum spanning tree for clustering the sample pixels (step S103). The minimum spanning tree is a tree structure in which all the sample pixels selected in the process of step S101 are connected by edges such that the sum of the distances calculated by the distance identification unit 121 is minimized, so that no closed paths are configured. In this example embodiment, each of the edges in the minimum spanning tree is weighted by the distance between the two sample pixels connected to the edge.

Figure 5:
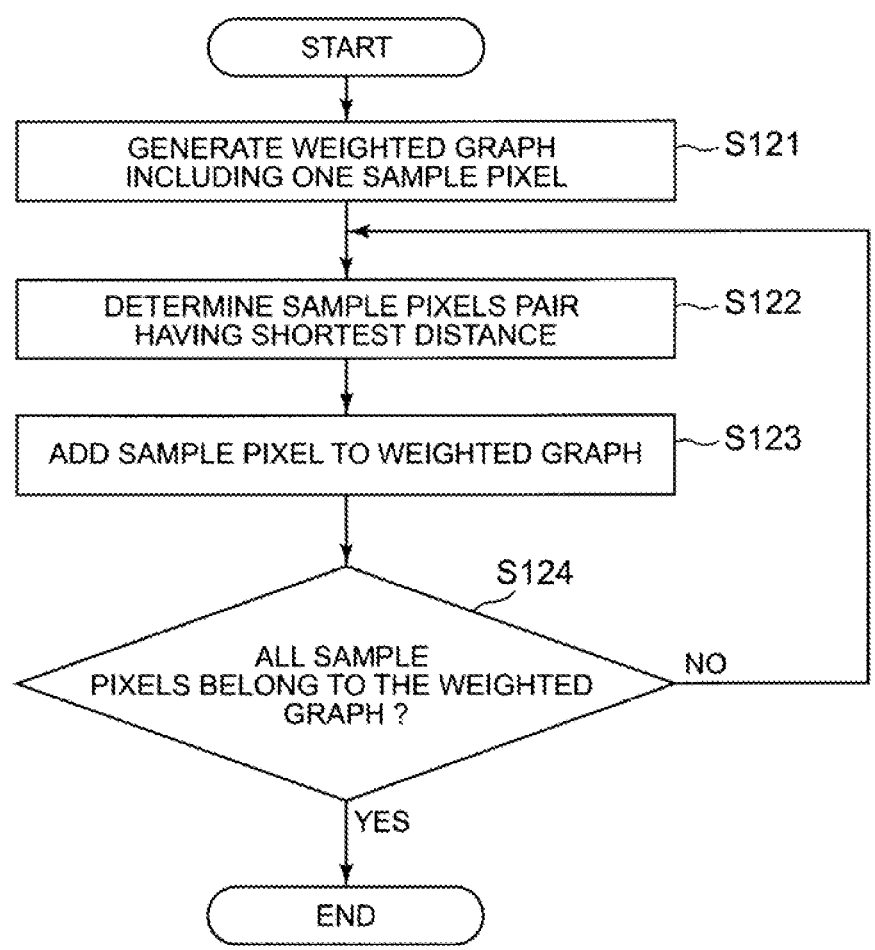
FIG. 5 It depicts a flowchart showing an example of an operation of a minimum spanning tree generation unit.

FIG. 5 is a flowchart showing the operation of the minimum spanning tree generation unit 122.

In the example shown in FIG. 5, the minimum spanning tree generation unit 122 generates the minimum spanning tree by the prim method for clustering, but the minimum spanning tree may also be generated by the Kruskal's algorithm.

The clustering unit 102 may also use other clustering methods, as long as the correlation of the phases of at least the sample pixels is used. One example of another clustering methods is to classify the sample pixels into one of the clusters based on the distance between the sample pixels and the centroid of the respective cluster. Another example of a clustering method is to classify a sample pixel into one of the clusters based on the similarity between the pixels calculated by a function called a kernel. As a method using a kernel, a graph may be generated by calculating the similarity between pixels and dividing the edges such that the similarity is minimized, or a method may be used to maximize the similarity between each pixel and a centroid defined based on the similarity.

In the example shown in FIG. 5, the minimum spanning tree generation unit 122 randomly selects one of the sample pixels to generate a weighted graph (step S121). Next, the minimum spanning tree generation unit 122 determines a distance between any sample pixel belonging to the weighted graph and a plurality of sample pixels not belonging to the weighted graph. The minimum spanning tree generation unit 122 decides a pair of two sample pixels that have the shortest distance to the sample pixel belonging to the weighted graph (step S122). The distance is calculated by the distance identification unit 121, which includes the correlation coefficient calculation unit 1211, the distance calculation unit 1212, and the integration unit 1213, as described above.

The minimum spanning tree generation unit 122 adds a sample pixel in the determined pair that do not belong to the weighted graph to the weighted graph (step S123). The minimum spanning tree generation unit 122 adds an edge connecting two sample pixels included in the pair to the weighted graph.

Next, the minimum spanning tree generation unit 122 determines whether all the sample pixels belong to the weighted graph (step S124). When all the sample pixels belong to the weighted graph, the process is terminated. When there are sample pixels that do not belong to the weighted graph, the process returns to step S122.

The separation unit 123 clusters the sample pixels (step S104). That is, the separation unit 123 separates the minimum spanning tree using a predetermined threshold value. A set of sample pixels in each of the graphs generated by separating the weighted graphs becomes a cluster. The threshold value is determined based on an average value or a standard deviation of distances between two sample pixels connected by an edge in the minimum global tree. As an example, the separation unit 123 determines the clusters so that the distance between the pixels belonging to the clusters is less than or equal to the threshold value. The separation unit 123 may determine the clusters so that the standard deviation of the distances between the pixels belonging to the clusters is less than or equal to the threshold value, for example.

When generating clusters, the separation unit 123 may set a limit on the size (number of pixels belonging to) of each cluster.

Then, the coherence matrix calculation unit 103 calculates a coherence matrix using the phases of the clustered sample pixels (step S105). The method for calculating the coherence matrix has already been described.

Figure 6A:
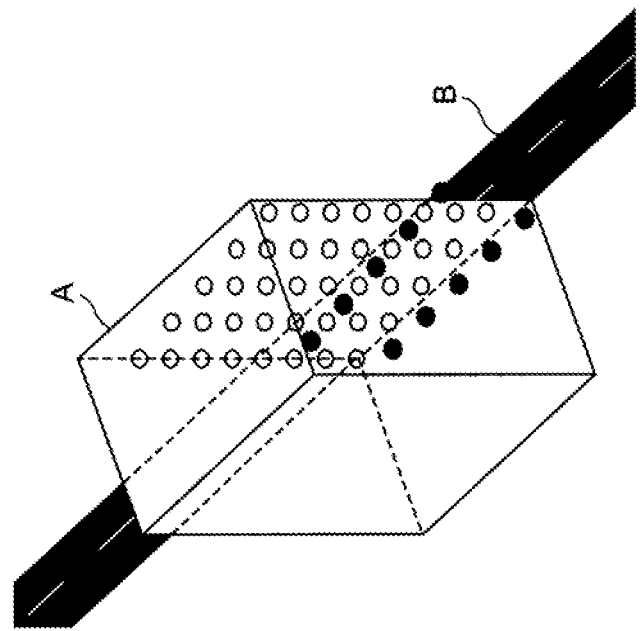
FIG. 6A It depicts an explanatory diagram for explaining clustering.
Figure 6B:
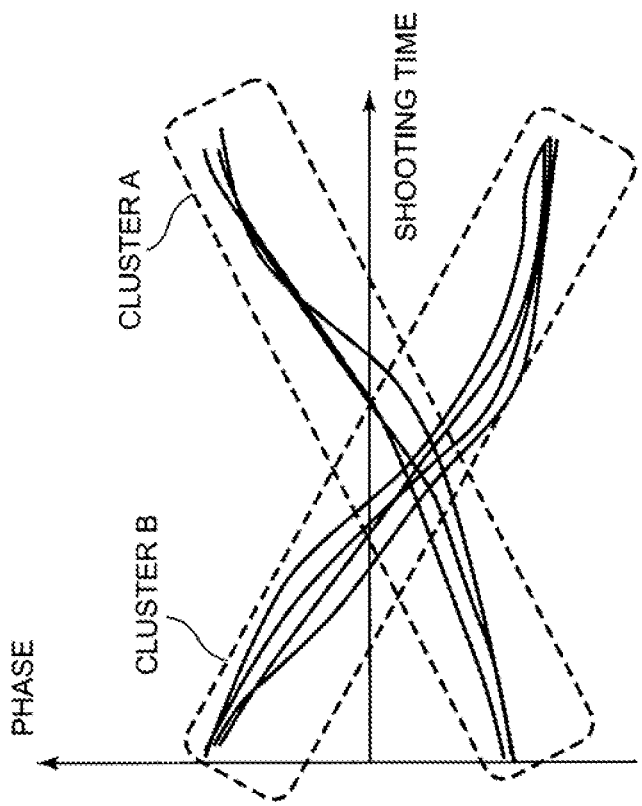
FIG. 6B It depicts an explanatory diagram for explaining clustering.

FIGS. 6A and 6B are explanatory diagrams for explaining clustering in this example embodiment. In the example shown in FIGS. 6A and 6B, a building A and a road B are included in the SAR image. In FIG. 6A, the circles indicate sample pixels. The white circles indicate pixels associated with the wall of the building A. The black filled circles indicate pixels associated with the road B.

For the multiple sample pixels associated with the wall of the building A, the distance between the phase of one sample pixel and the phase of another sample pixel is short. Therefore, they are classified into a cluster A, as shown in FIG. 6B. With respect to the plurality of sample pixels associated with the road B, the distance between the phase of each sample pixel and the phase of other sample pixels is short. Therefore, they are classified into a cluster B, as shown in FIG. 6B.

As described above, the image processing device 1 of this example embodiment clusters the sample pixels based on the correlation of the phases of at least the sample pixels. Since clusters are generated that contain sample pixels with aligned magnitudes of the average of the phases $\theta_{m,n}$ and the variance of the phases $\theta_{m,n}$ an accurate coherence matrix is calculated.

The effects of this example embodiment will be explained in more detail with reference to explanatory diagrams of FIGS. 7A, 7B, 8 and 9.

Suppose that there are pixels a, b, c, and d whose phases vary as shown in FIG. 7A. Further, suppose that similar pixels c and d are selected based on intensity as described in patent literature 2 (refer to FIG. 7B). As shown in FIG. 7B, if the average variations of the phase of each of the pixels c and d are comparable and the variances of the phase of the pixels c and d are small, the accuracy of the calculated coherence matrix is not low.

Figure 8:
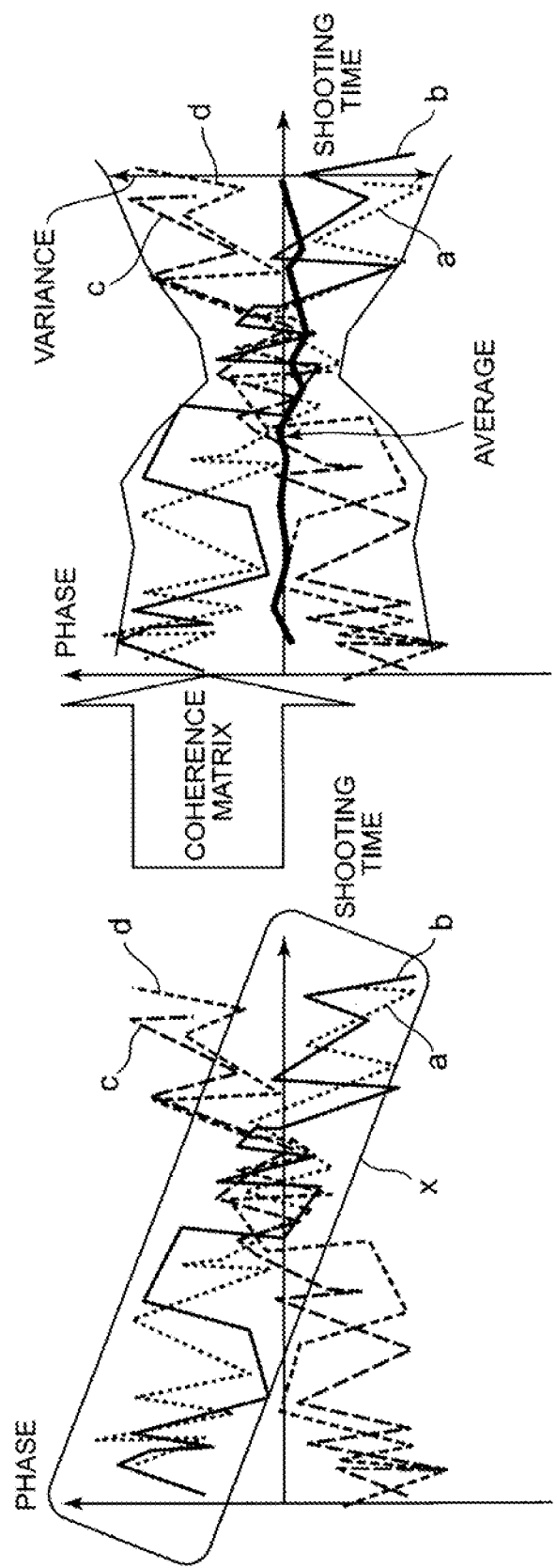
FIG. 8 It depicts an explanatory diagram for explaining a result of the coherence matrix calculation.

However, as shown in FIG. 8, if there are pixels a, b, c, and d that are determined to be similar based on the intensity and have larger phase variances (refer to the other pixels out of the frame X in FIG. 8), then as shown in FIG. 8, since the coherence matrix is calculated based on the pixels with different statistical properties, the accuracy of the calculated coherence matrix will be low.

Figure 9:
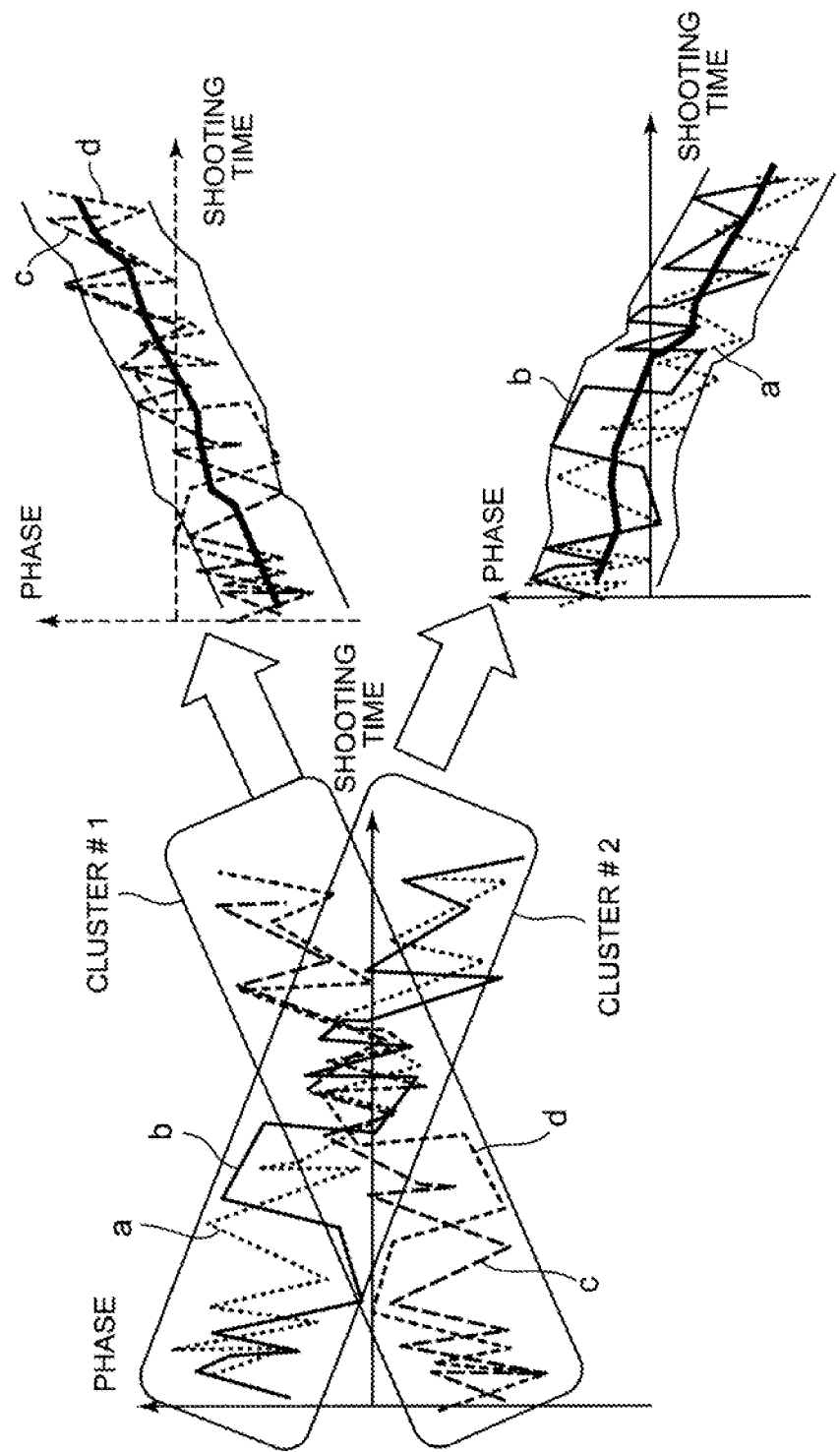
FIG. 9 It depicts an explanatory diagram for explaining a result of the coherence matrix calculation.

FIG. 9 is an explanatory diagram for explaining a result of the coherence matrix calculation by an image processing method implemented in the image processing device 1 of this example embodiment.

In this example embodiment, as shown in FIG. 9, pixels that have similar statistical properties of phase (for example, variance and average) belong to one cluster (cluster #1 and cluster #2, respectively). Then, a coherence matrix is calculated for each cluster. Therefore, the accuracy of the calculated coherence matrix is high.

Example Embodiment 2

Figure 10:
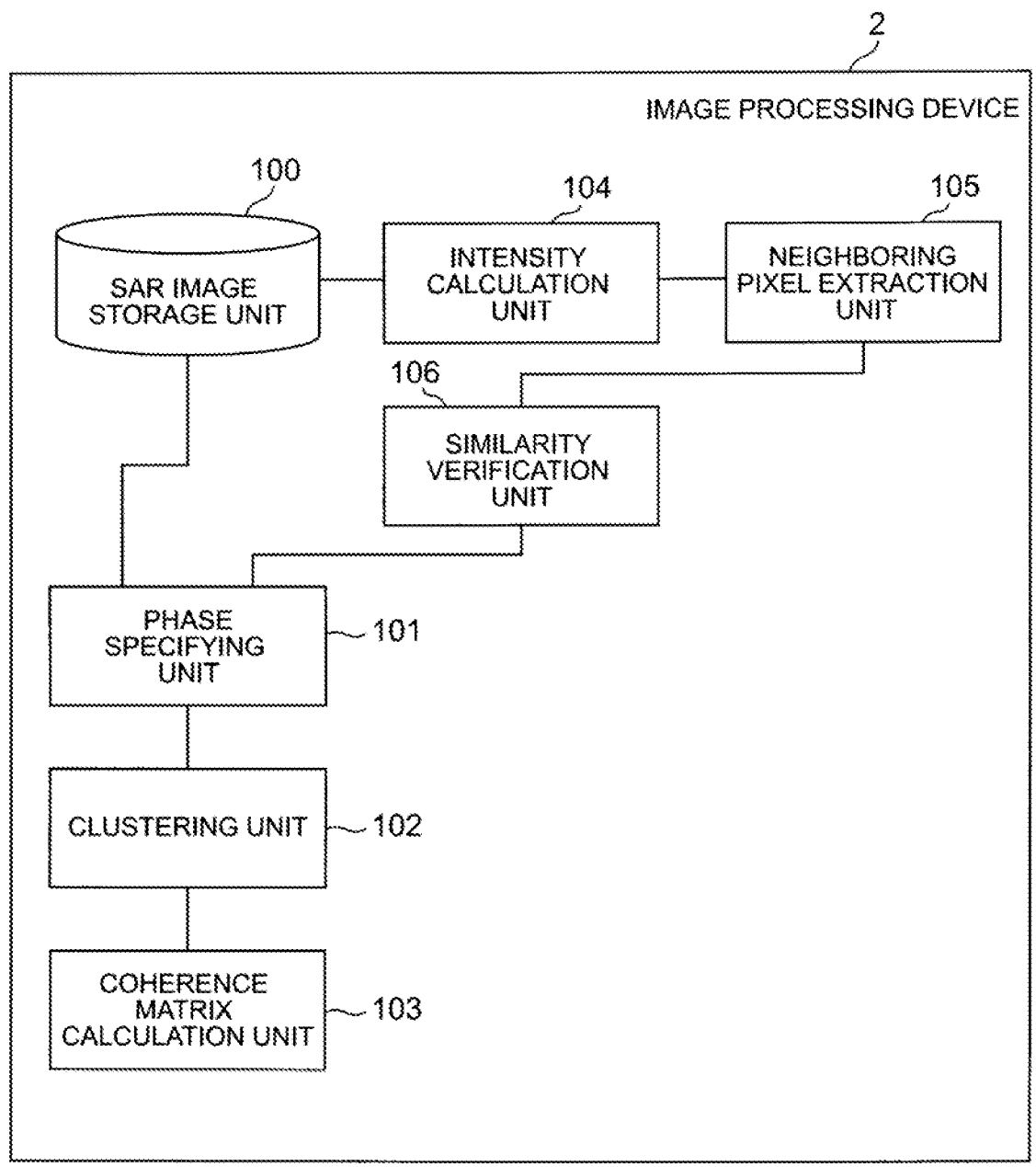
FIG. 10 It depicts a block diagram showing a configuration example of an image processing device of the second example embodiment.

FIG. 10 is a block diagram showing an example configuration of an image processing device of the second example embodiment. The image processing device 2 shown in FIG. 10 includes a SAR image storage unit 100, a phase specifying unit 101, a clustering unit 102, a coherence matrix calculation unit 103, an intensity calculation unit 104, a neighboring pixel extraction unit 105, and a similarity verification unit 106.

The intensity calculation unit 104 calculates intensity of the pixel. The neighboring pixel extraction unit 105 sets a window area including the sample pixel in the SAR image and extracts pixels in the window area. The similarity verification unit 106 identifies pixels (SHP) that are statistically homogeneous with the sample pixel based on the intensity of the sample pixel and the intensity of the extracted pixel.

The functions of the SAR image storage unit 100, the phase specifying unit 101, the clustering unit 102, and the coherence matrix calculation unit 103 are the same as the functions in the first example embodiment.

Figure 11:
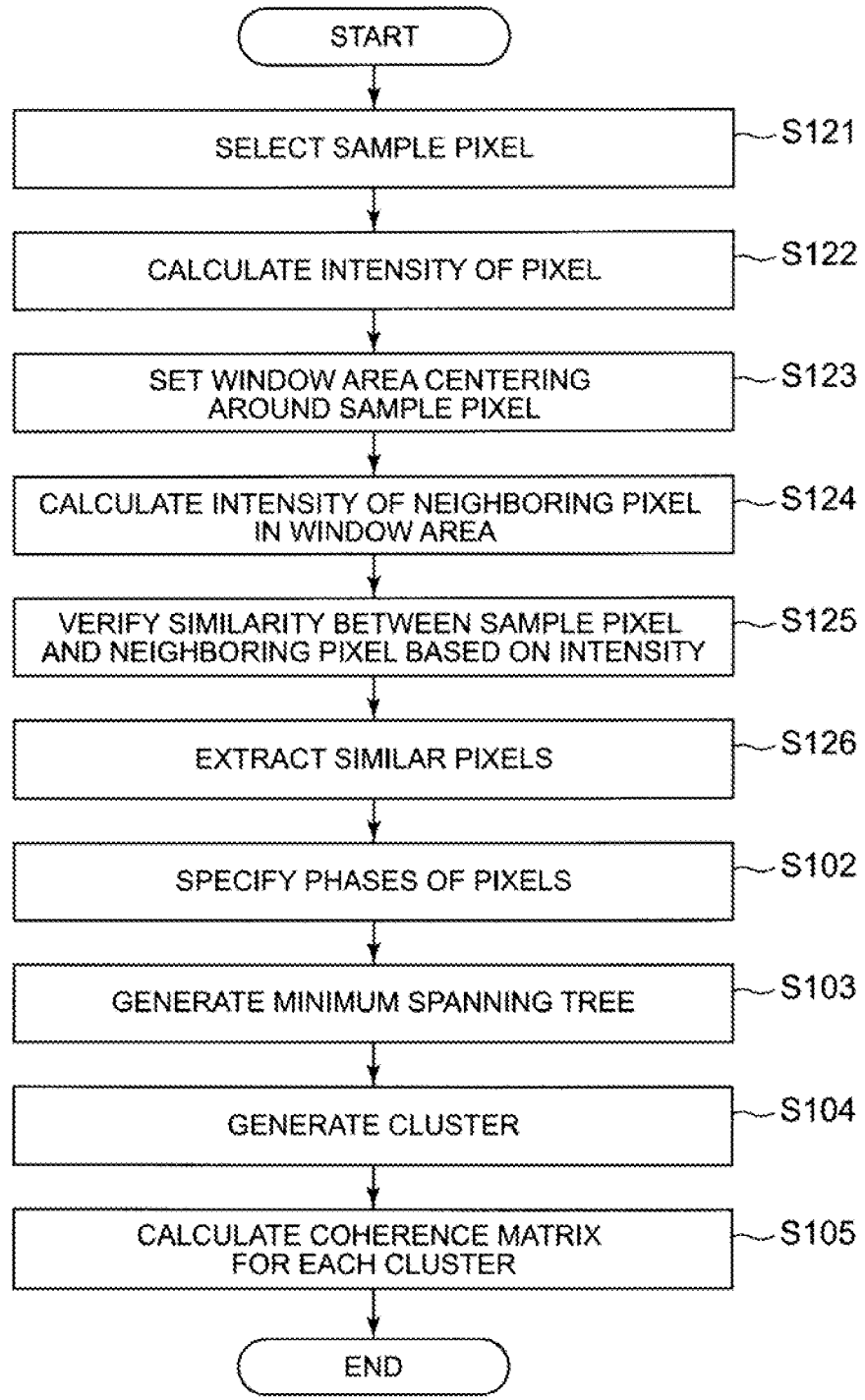
FIG. 11 It depicts a flowchart showing an example of an operation of an image processing device of the second example embodiment.

Next, the operation of the image processing device 2 will be described with reference to the flowchart in FIG. 11. FIG. 11 is a flowchart showing the operation of the image processing device 2.

The intensity calculation unit 104 selects a sample pixel from the SAR image (step S121), and calculates intensity (which may be an amplitude value) of the sample pixel (Step S122). The sample pixels are PS point pixels, for example, but they may be all pixels in the SAR image.

The neighboring pixel extraction unit 105 sets a window area in the SAR image that includes the sample pixel, such as a window area in which the closest pixel from the centroid is the sample pixel (Step S123). Then, the neighboring pixel extractor 105 extracts pixels in the window area as neighboring pixels. The size of the window area is arbitrary, but as an example, 10×10 pixels in height and width or 100×100 pixels are used as the size of the window area. The size of the window area is not limited to an even number. In addition, the shape of the window area is not limited to a square. The shape of the window area may be a rectangle (11×21 pixels, as an example) or a non-rectangle such as an ellipse. The shape of the window area may be different for each sample pixel, depending on the topography or other factors. The window area may be composed of a plurality of discrete pixels (for example, the window area is formed by a plurality of pixels selected every other pixel), rather than a plurality of consecutive pixels. For example, the window area is formed by a plurality of pixels selected every other pixel.

The similarity verification unit 106 calculates intensity of the neighboring pixels (step S124). The similarity verification unit 106 verifies, for example, whether the intensity of the sample pixel and the intensity of the neighboring pixel are generated by the same probability distribution function (step S125). Then, the similarity verification unit 106 makes the neighboring pixel generated by the same probability distribution function as the sample pixel a statistically homogeneous pixel with the sample pixel (step S126). The similarity verification unit 106 outputs the plurality of pixels (including the sample pixel) that are statistically homogeneous with the sample pixel to the phase specifying unit 101.

The phase specifying unit 101, the clustering unit 102, and the coherence matrix calculation unit 103 operate in the same manner as in the first example embodiment. However, the phase specifying unit 101 specifies a phase for a plurality of pixels that are statistically homogeneous with the sample pixels (pixels extracted by the similarity verification unit 106). In addition, the clustering unit 102 performs clustering for the pixels extracted by the similarity verification unit 106.

In this example embodiment, since the image processing device 2 increases the number of pixels used for generating the coherence matrix based on the identity (being statistically homogeneous) of the pixels based on the intensity, and also performs clustering based on the phase, possibility of calculating a more accurate coherence matrix increases. The identity refers to whether or not the image is statistically homogeneous. In other words, the identity indicates that the pixels are similar.

Example Embodiment 3

Figure 12:
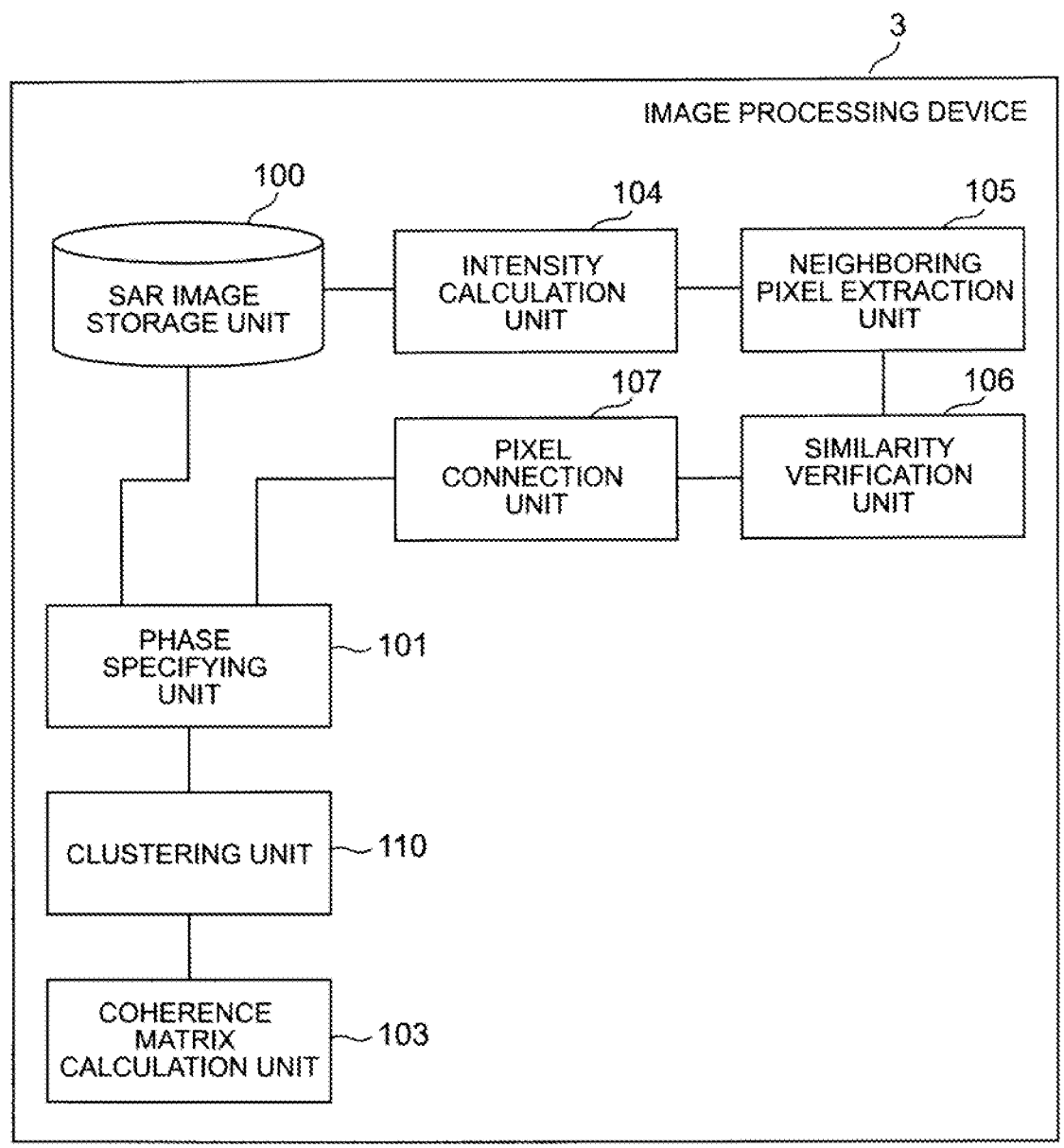
FIG. 12 It depicts a block diagram showing a configuration example of an image processing device of the third example embodiment.

FIG. 12 is a block diagram showing an example configuration of an image processing device of the third example embodiment. The configuration of the image processing device 3 shown in FIG. 12 is a configuration in which a pixel connection unit 107 is added to the image processing device 2 of the second example embodiment, and a clustering unit 102 is replaced by a clustering unit 110.

The pixel connection unit 107 connects the pixels that have identity based on intensity to graph them. As described below, the clustering unit 110 performs clustering by a process different from the process of the clustering unit 102 in the second example embodiment.

Figure 13:
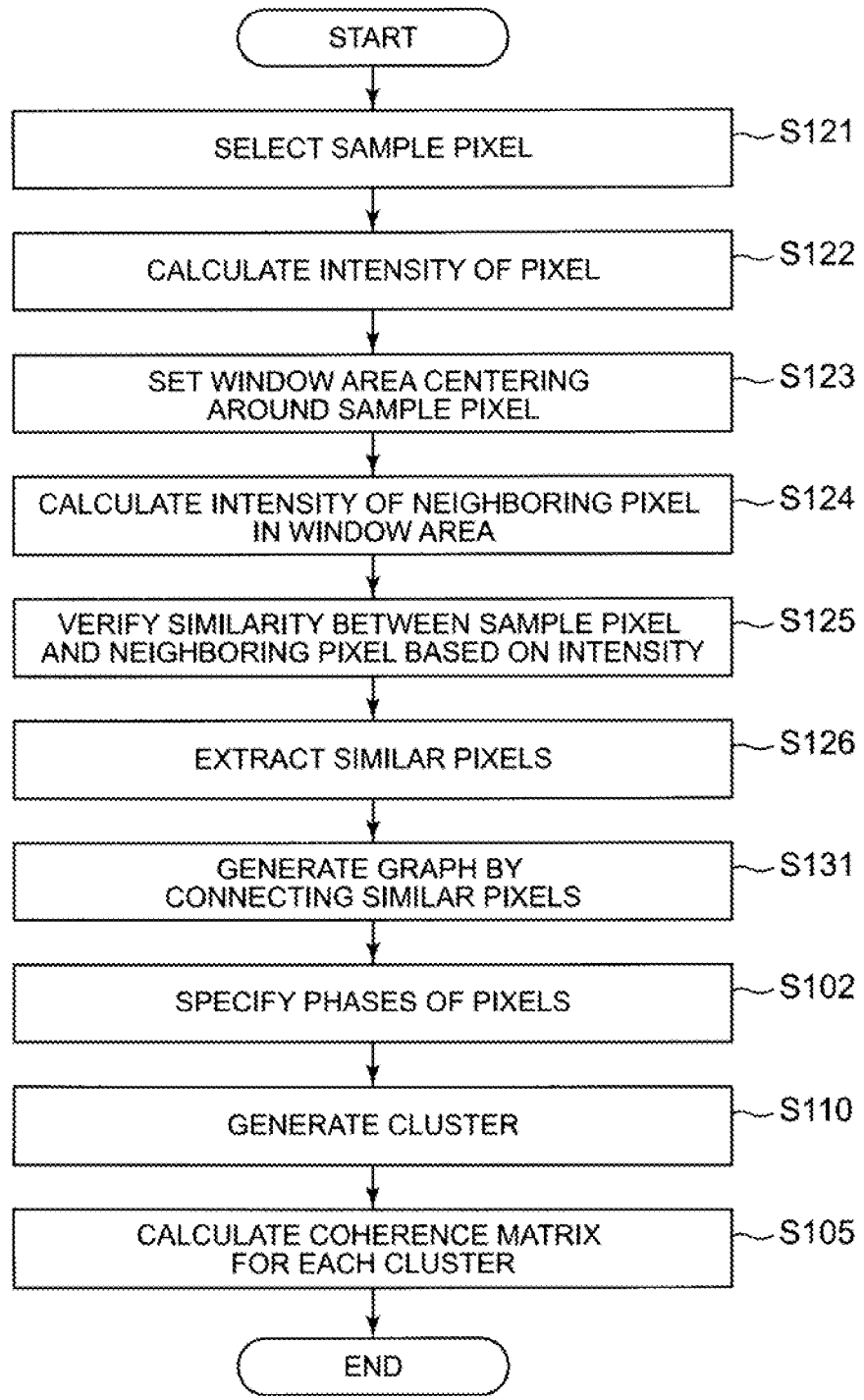
FIG. 13 It depicts a flowchart showing an example of an operation of an image processing device of the third example embodiment.

FIG. 13 is a flowchart showing the operation of the image processing device 3. As shown in FIG. 13, the image processing device 3 executes the processing of step S131 in addition to the processing of the image processing device 2 of the second example embodiment (the processing shown in FIG. 11). In addition, the image processing device 3 executes the process of step S110 in place of the processes of steps S103 and S104 shown in FIG. 11. The other processing is the same as the processing performed by the image processing device 2 of the second example embodiment.

In step S131, the pixel connecting unit 107 generates a graph by connecting pixels that are determined to be identical by the similarity verification unit 106. In step S110, the clustering unit 110 generates clusters by cutting edges between pixels whose phase correlation is less than a predetermined threshold value. The threshold value is set according to the size of the desired cluster and the like.

In this example embodiment, as in the second example embodiment, since the image processing device 3 increases the number of pixels used for generating the coherence matrix based on the identity of the pixels based on the intensity, and also performs clustering based on the phase, possibility of calculating a more accurate coherence matrix increases.

FIGS. 14A to 14D are explanatory diagrams for explaining the action of the pixel connection 107.

The neighboring pixel extraction unit 105 and the similarity verification unit 106 verify the identity based on the intensity of the sample image in the SAR image as illustrated in FIG. 14A (refer to FIG. 14B). The pixel connection unit 107 connects pixels that are determined to be identical (similar) to each other to graph the pixels in the SAR image (refer to FIG. 14C). In FIG. 14C, the connection is represented schematically and is not consistent with the state shown in FIG. 14B.

The clustering unit 110 generates clusters by cutting edges between pixels with weak phase correlation (refer to FIG. 14D). Four clusters are illustrated in FIG. 14D.

Example Embodiment 4

Figure 15:
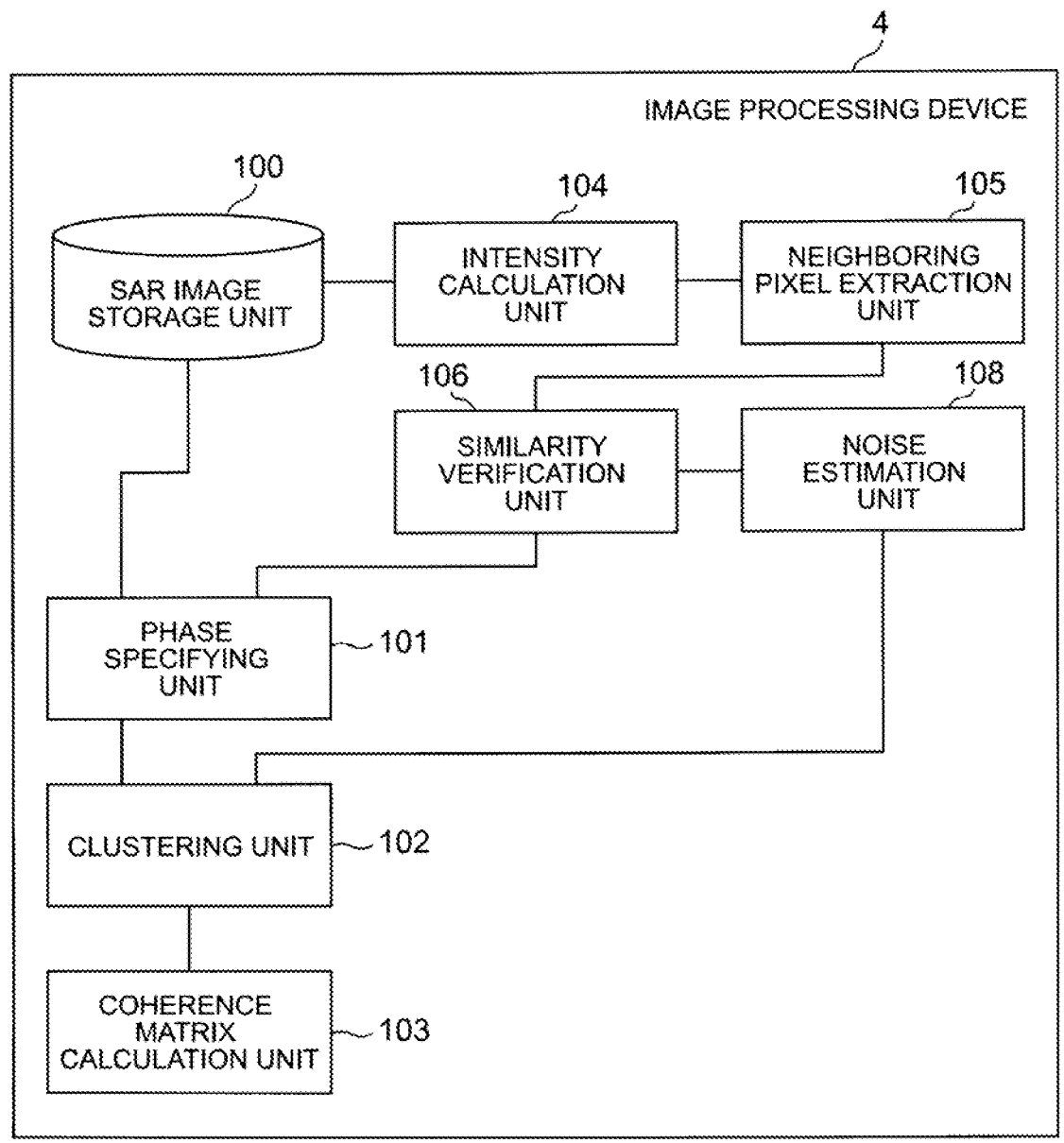
FIG. 15 It depicts a block diagram showing a configuration example of an image processing device of the fourth example embodiment.

FIG. 15 is a block diagram showing an example configuration of an image processing device of the fourth example embodiment. The configuration of the image processing device 4 shown in FIG. 15 is a configuration in which a noise estimation unit 108 is added to the image processing device 2 of the second example embodiment.

The noise estimation unit 108 estimates statistical properties on noise in the surrounding pixels. As noise in a SAR image, for example, there is noise caused by fluctuations in intensity among pixels. In that case, the variance of the intensity of the pixels is reflected in the noise.

Figure 16:
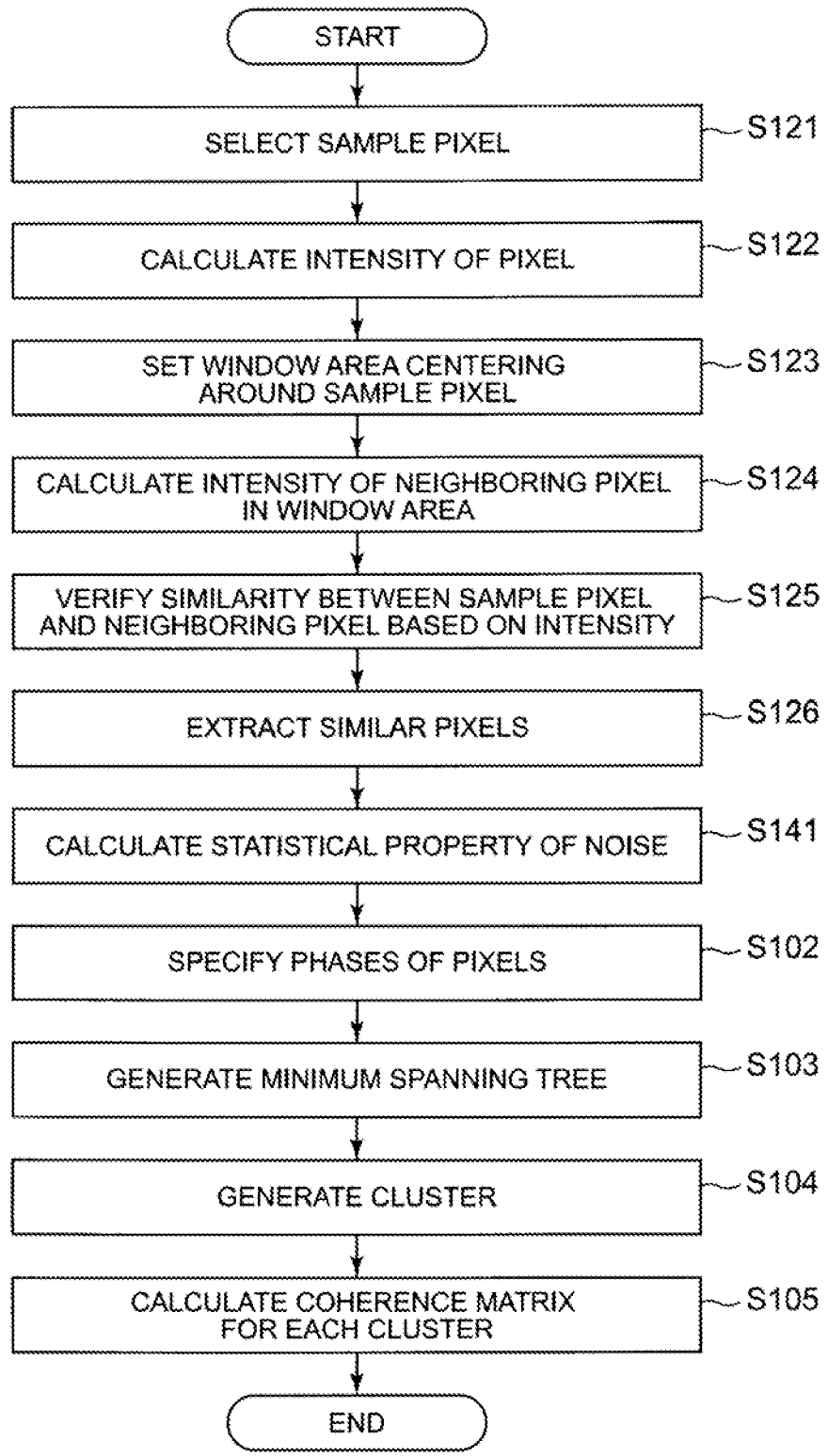
FIG. 16 It depicts a flowchart showing an example of an operation of an image processing device of the fourth example embodiment.

FIG. 16 is a flowchart showing the operation of the image processing device 4. As shown in FIG. 16, the image processing device 4 executes the processing of step S141 in addition to the processing of the image processing device 2 of the second example embodiment (refer to FIG. 11). Other processing is the same as the processing performed by the image processing device 2 of the second example embodiment. However, as described below, the clustering unit 102 refers to the processing result of the noise estimation unit 108 when clustering the pixels.

In step S141, the noise estimation unit 108 calculates, for example, the variance of the intensity of each pixel selected according to the result of the verification by the similarity verification unit 106. The noise estimation unit 108 outputs the calculation result to the clustering unit 102.

In the clustering process, the clustering unit 102 may, for example, relax the criteria for classification into the same cluster when the variance of the intensity regarding the pixels to be clustered is large. As an example, the clustering unit 102 reduces the threshold for classifying into the same cluster. In addition, for pixels with small intensity variance (i.e., small noise), the criteria for being classified into the same cluster can be increased. By executing such processing by the clustering unit 102, a plurality of pixels having a large phase correlation are classified into the same cluster.

In this example embodiment, the variance of the pixel intensity is used as an example as a statistical property on noise, but the statistical property on noise is not limited to the variance of the pixel intensity. Other statistical properties such as an average of the pixel intensity may be used as the statistical property on noise.

In addition, although this example embodiment uses the example of the clustering threshold being changed based on statistical property on noise, statistical property on noise may be used for other purposes. For example, the statistical property on noise can be used to change the degree (measure) of correlation to be determined to belong to one cluster when pixels are clustered based on the phase correlation of the pixels.

When the image processing device 4 of this example embodiment is used, the processing result of the noise estimation unit 108 may be used to obtain a desired accuracy of the coherence matrix. For example, the parameters (for example, threshold) for clustering may be modified based on statistical properties on the noise in order to obtain a desired accuracy of the coherence matrix.

Example Embodiment 5

Figure 17:
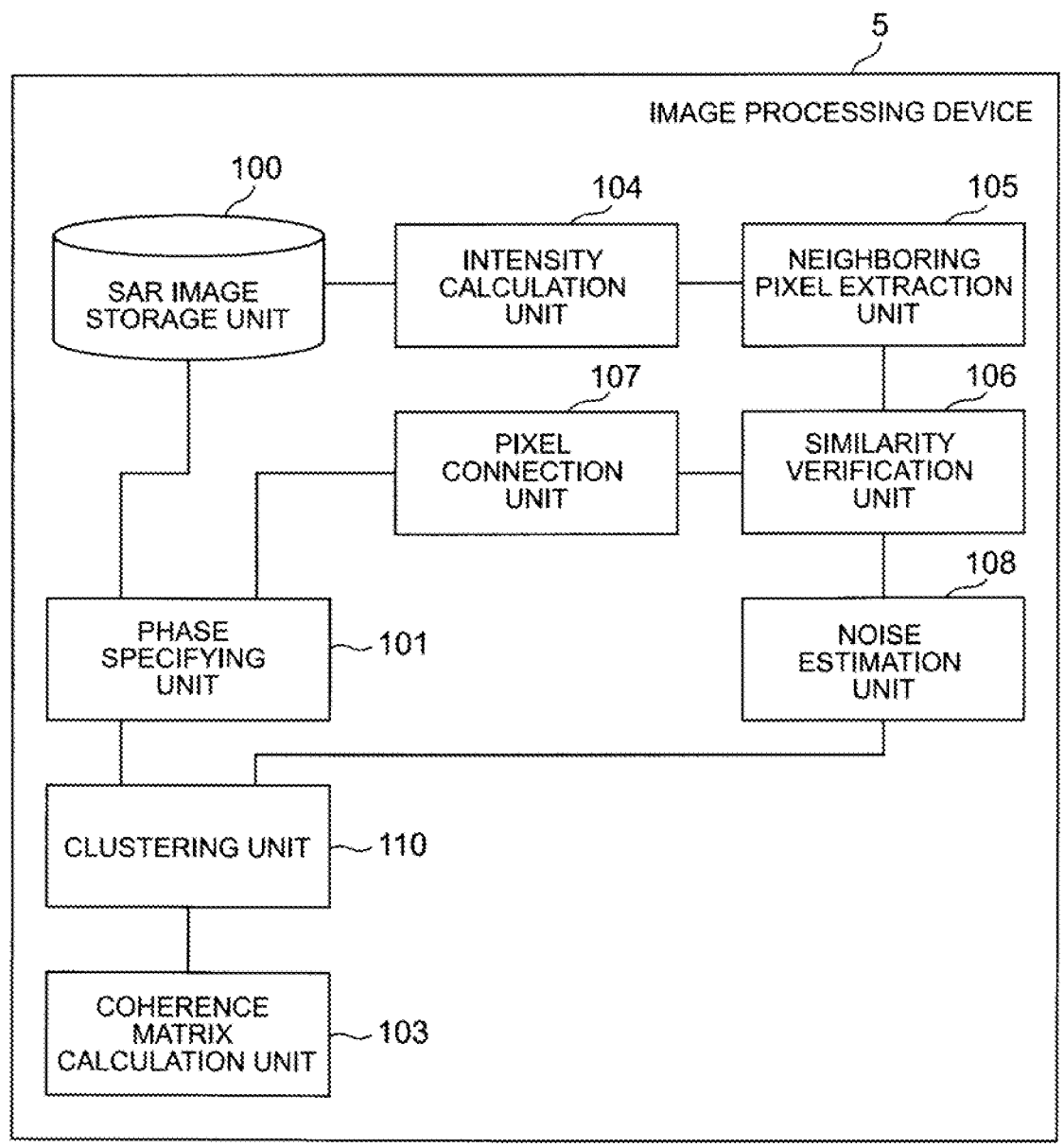
FIG. 17 It depicts a block diagram showing a configuration example of an image processing device of the fifth example embodiment.

FIG. 17 is a block diagram showing an example configuration of an image processing device of the fifth example embodiment. The configuration of the image processing device 5 shown in FIG. 17 is a configuration in which a noise estimation unit 108 is added to the image processing device 3 of the third example embodiment shown in FIG. 12.

Figure 18:
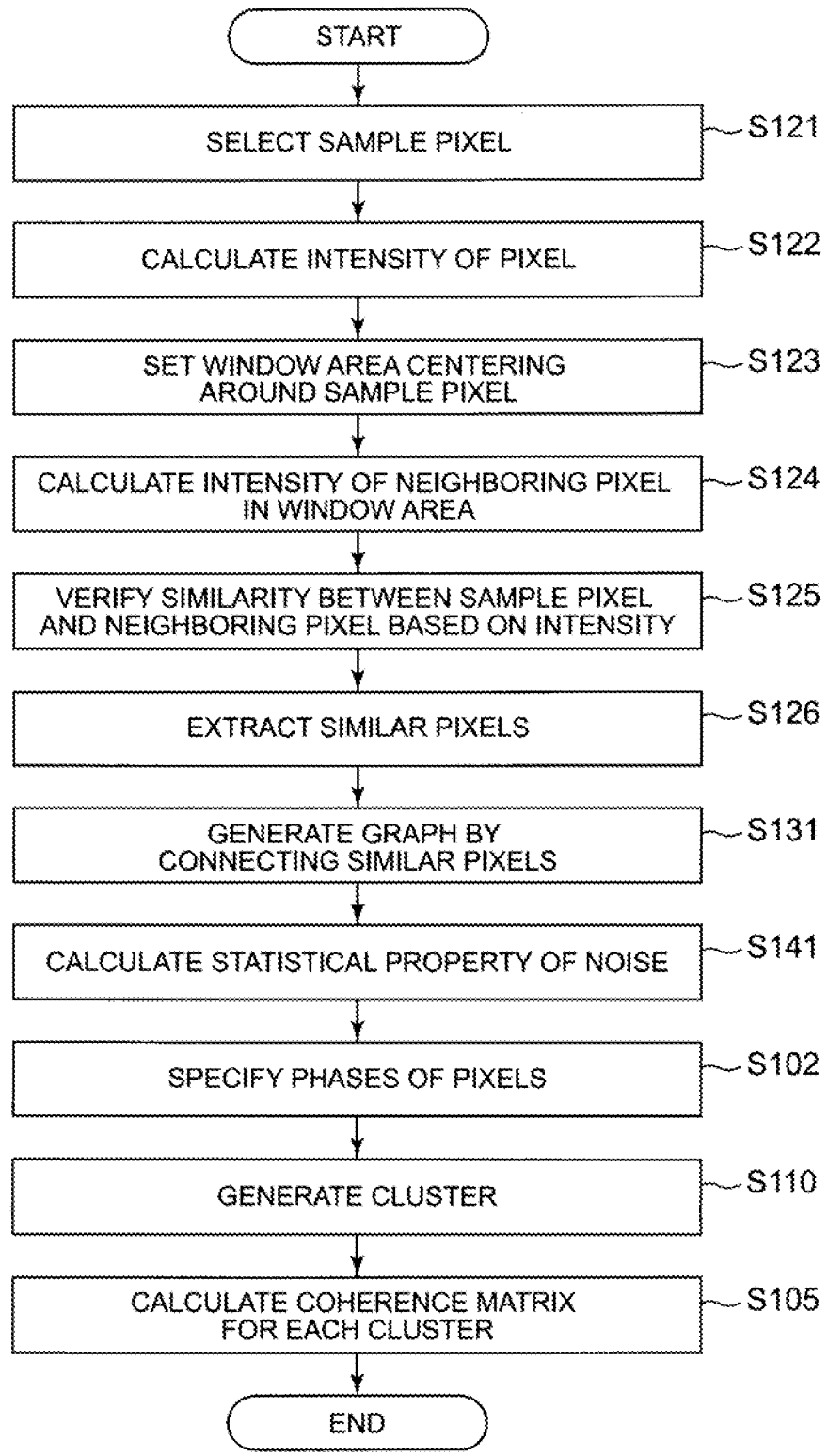
FIG. 18 It depicts a flowchart showing an example of an operation of an image processing device of the fifth example embodiment.

FIG. 18 is a flowchart showing the operation of the image processing device 5. As shown in FIG. 18, the image processing device 5 executes the processing of step S141 in addition to the processing of the image processing device 3 of the third example embodiment (refer to FIG. 13). The other processing is the same as the processing performed by the image processing device 4 of the fourth example embodiment shown in FIG. 15. However, the clustering unit 110 refers to the processing result of the noise estimation unit 108 when clustering the pixels. The clustering unit 110 refers to the processing result of the noise estimation unit 108 in a manner similar to the manner in which the clustering unit 102 refers to the processing result of the noise estimation unit 108 in the fourth example embodiment.

The processing of step S141 is the same as the processing performed by the noise estimation unit 108 in the fourth example embodiment, but the processing of step S131 by the pixel connection unit 107 and the processing of step S141 by the noise estimation unit 108 can be performed simultaneously.

In this example embodiment, as in the case of the third example embodiment, possibility of calculating a more accurate coherence matrix increases, and as in the case of the fourth example embodiment, the processing result of the noise estimation unit 108 can be used to obtain the desired accuracy of the coherence matrix.

In each of the above-described example embodiments, a coherence matrix is used as the data that enables the phase statistic to be grasped, but data other than the coherence matrix may be used as the data that enables the phase statistic to be grasped, as long as the data includes information that enables the average phase (specifically, the phase difference) of the pixels and the magnitude of the variance of the phase (specifically, the phase difference) to be grasped. Data other than a coherence matrix may be used.

Figure 19:
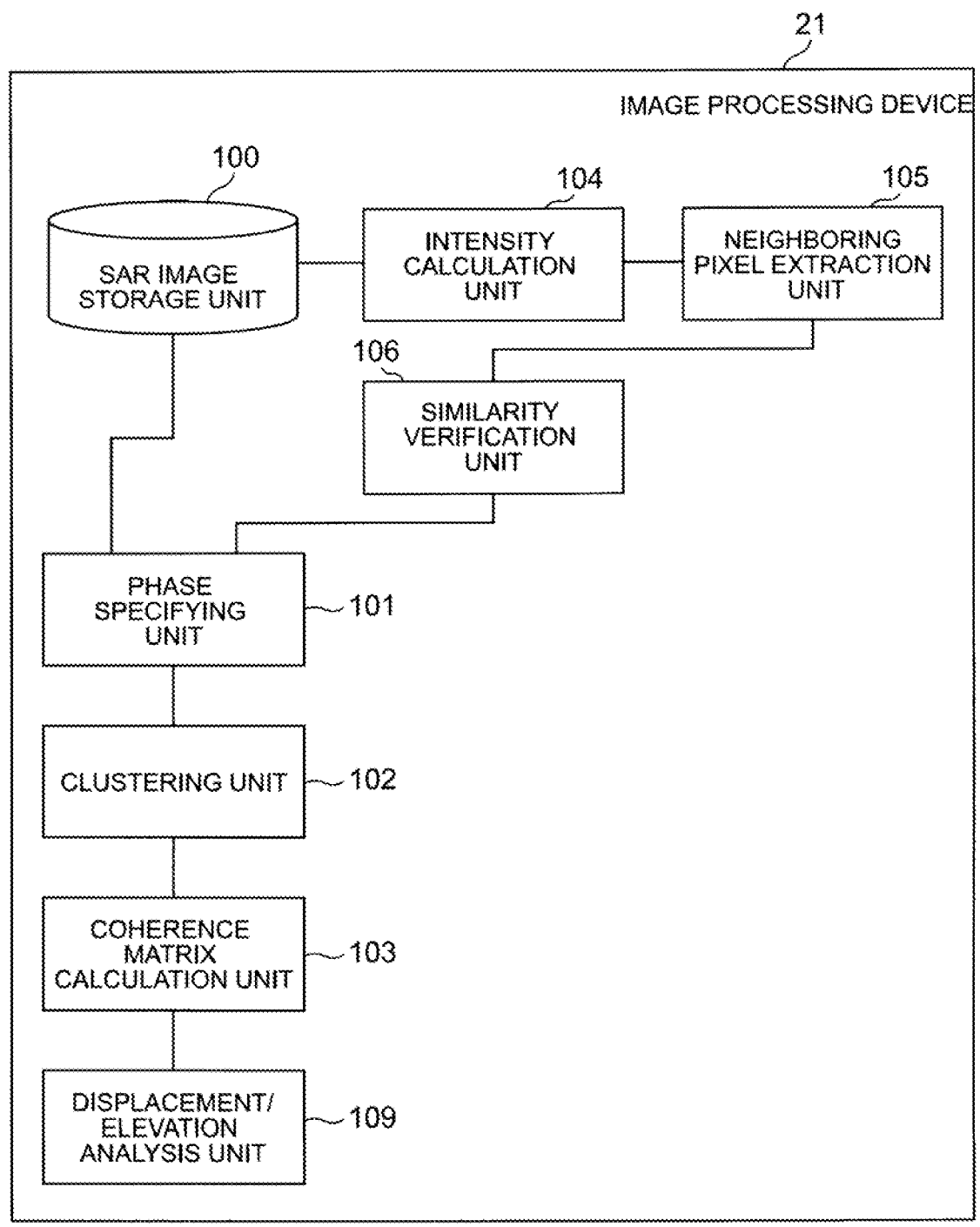
FIG. 19 It depicts a block diagram showing a configuration example of an image processing device used for displacement analysis or elevation analysis.

FIG. 19 is a block diagram showing an example configuration of an image processing device used for displacement analysis or elevation analysis. The configuration of the image processing device 21 shown in FIG. 19 is a configuration in which a displacement analysis/elevation analysis unit 109 is added to the image processing device 2 of the second example embodiment shown in FIG. 10. The displacement analysis/elevation analysis unit 109 performs displacement analysis or elevation analysis of the ground surface based on the coherence matrix.

The image processing device 21 includes a displacement analysis unit that performs displacement analysis, but does not include an elevation analysis unit. The image processing device 21 may also be configured to include an elevation analysis unit that performs elevation analysis, but does not include a displacement analysis unit.

As described above, when the pair of SAR images is (m, n), the component $c_{m,n}$ of the coherence matrix corresponds to the value with $\exp(-j\theta_{m,n})$ being averaged. Therefore, the displacement analysis unit in the displacement analysis/ elevation analysis unit 109 or an independent displacement analysis unit can perform accurate displacement analysis by converting the components of the coherence matrix into displacements and analyzing the displacements obtained after the conversion.

The displacement analysis unit in the displacement analysis/elevation analysis unit 109 or the independent elevation analysis unit can perform accurate elevation analysis by converting the components of the coherence matrix to elevation and analyzing the elevation obtained after the conversion.

In the image processing unit 2 of the second example embodiment, since possibility of calculating a more accurate coherence matrix increases, the accuracy of displacement analysis by the displacement analysis unit and the accuracy of elevation analysis by the elevation analysis unit are also improved.

Figure 20:
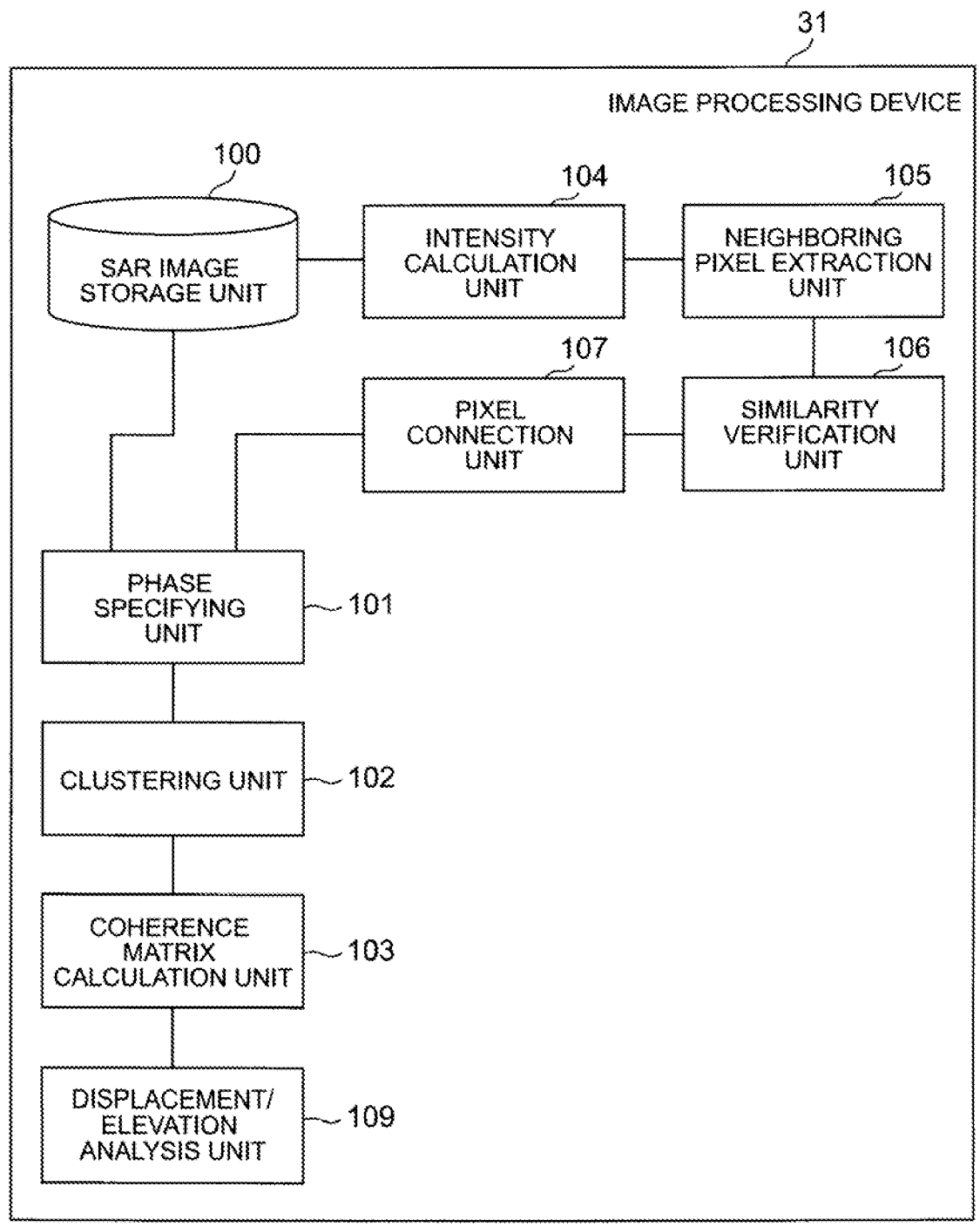
FIG. 20 It depicts a block diagram showing another configuration example of an image processing device used for displacement analysis or elevation analysis.

FIG. 20 is a block diagram showing another configuration example of an image processing device used for displacement analysis or elevation analysis. The configuration of the image processing device 31 shown in FIG. 20 is a configuration in which a displacement analysis/elevation analysis unit 109 is added to the image processing device 3 of the third example embodiment shown in FIG. 12. The displacement analysis/elevation analysis unit 109 performs displacement analysis or elevation analysis based on the coherence matrix. The operation of the displacement analysis/elevation analysis unit 109 shown in FIG. 20 is the same as the operation of the displacement analysis/elevation analysis unit 109 shown in FIG. 19.

In the image processing unit 3 of the third example embodiment, since possibility of calculating a more accurate coherence matrix increases, the accuracy of displacement analysis by the displacement analysis unit and the accuracy of elevation analysis by the elevation analysis unit are also improved.

Figure 21:
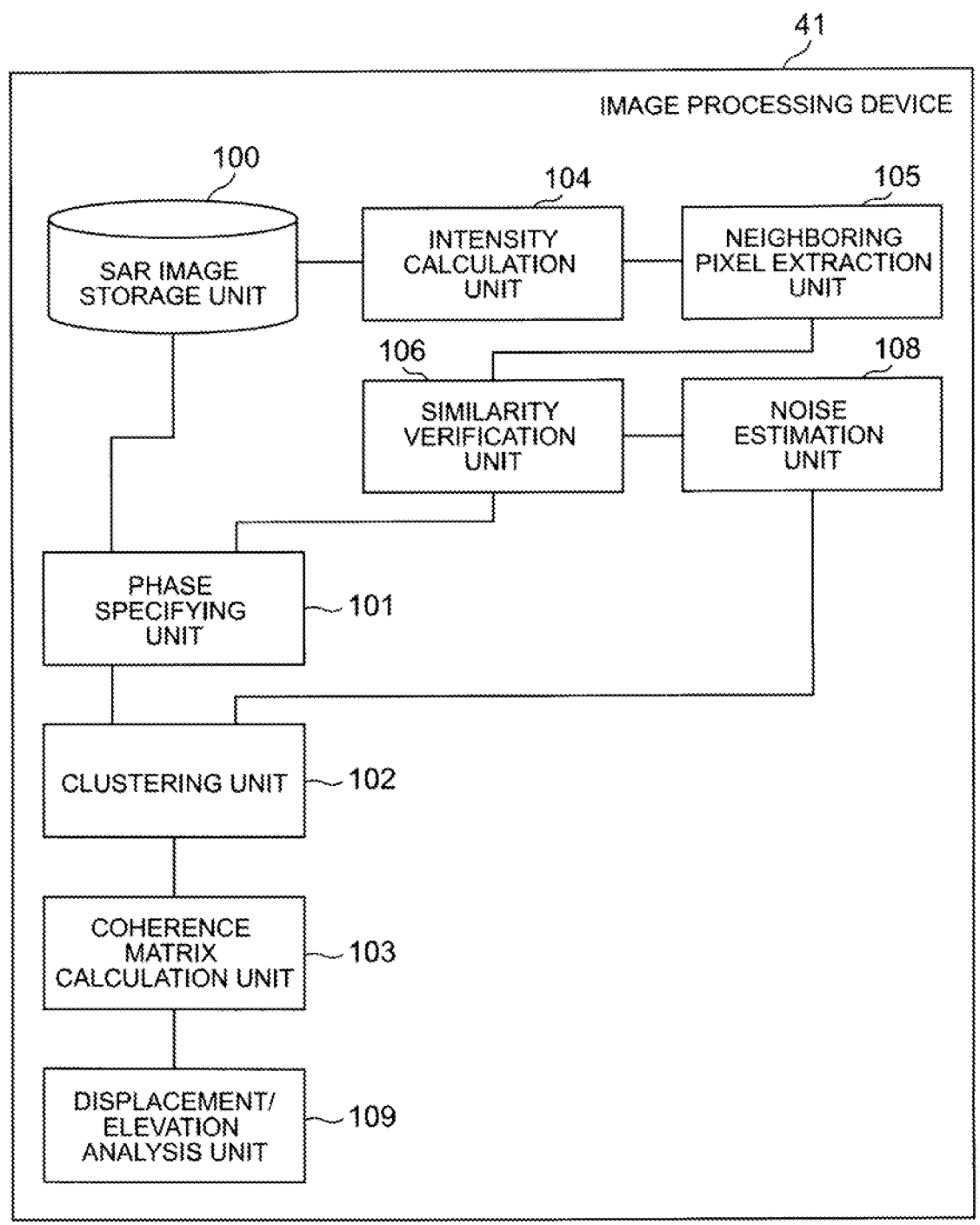
FIG. 21 It depicts a block diagram showing still another configuration example of an image processing device used for displacement analysis or elevation analysis.

FIG. 21 is a block diagram showing still another configuration example of an image processing device used for displacement analysis or elevation analysis. The configuration of the image processing device 41 shown in FIG. 21 is a configuration in which a displacement analysis/elevation analysis unit 109 is added to the image processing device 4 of the fourth example embodiment shown in FIG. 15. The displacement analysis/elevation analysis unit 109 performs displacement analysis or elevation analysis based on the coherence matrix. The operation of the displacement analysis/elevation analysis unit 109 shown in FIG. 21 is the same as the operation of the displacement analysis/elevation analysis unit 109 shown in FIG. 19.

In the image processing device 4 of the fourth example embodiment, since the accuracy of the coherence matrix can be adjusted to a desired degree, the accuracy of the displacement analysis and the accuracy of the elevation analysis can also be made to a desired degree.

Figure 22:
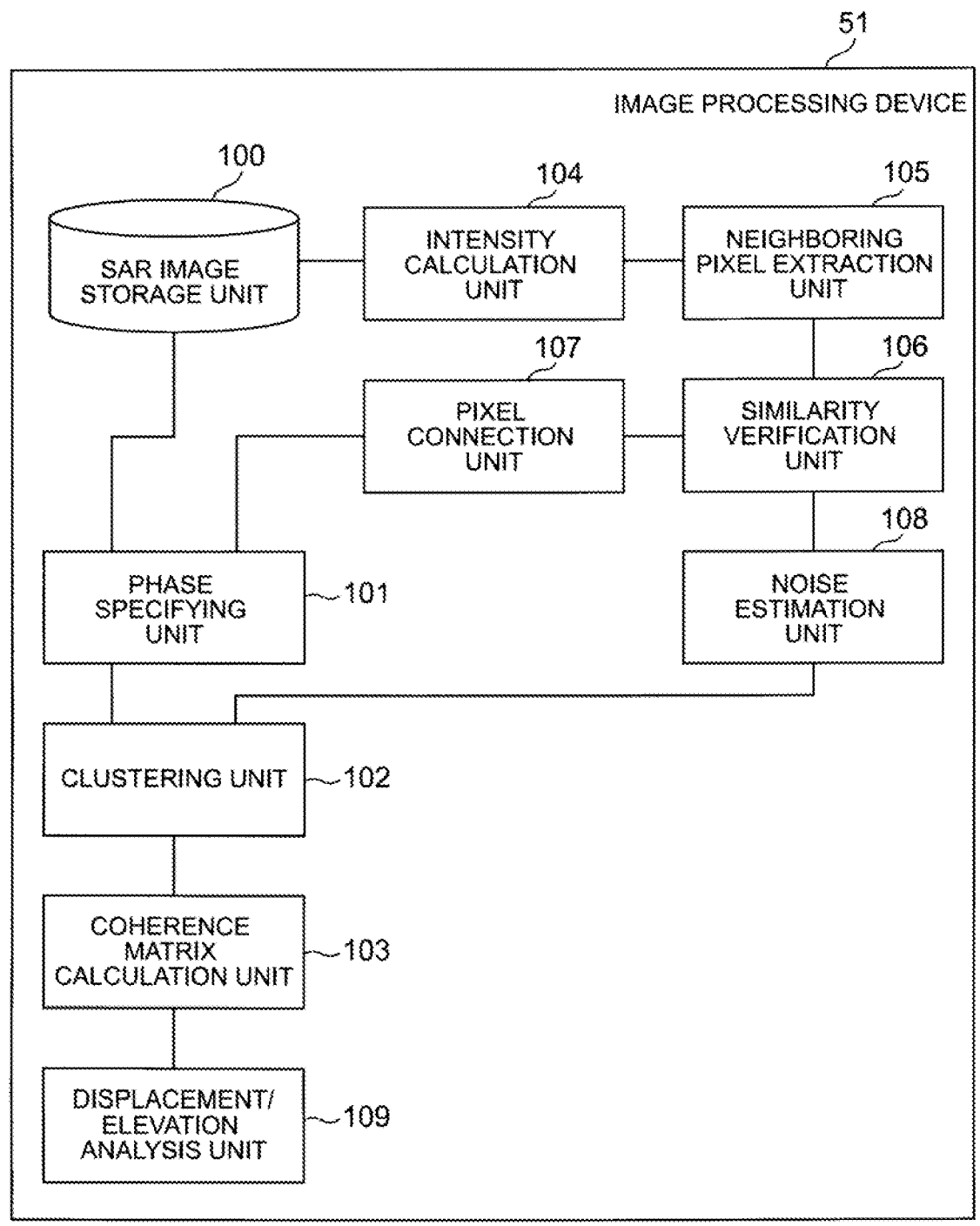
FIG. 22 It depicts a block diagram showing yet another configuration example of an image processing device used for displacement analysis or elevation analysis.

FIG. 22 is a block diagram showing yet another configuration example of an image processing device used for displacement analysis or elevation analysis. The configuration of the image processing device 51 shown in FIG. 22 is a configuration in which a displacement analysis/elevation analysis unit 109 is added to the image processing device 5 of the fifth example embodiment shown in FIG. 17. The displacement analysis/elevation analysis unit 109 performs displacement analysis or elevation analysis based on the coherence matrix. The operation of the displacement analysis/elevation analysis unit 109 shown in FIG. 22 is the same as the operation of the displacement analysis/elevation analysis unit 109 shown in FIG. 19.

In the image processing device 5 of the fifth example embodiment, since possibility of calculating a more accurate coherence matrix increases and the accuracy of the coherence matrix can be adjusted to a desired degree, that the accuracy of the displacement analysis and the accuracy of the elevation analysis can be improved, and the accuracy of the displacement analysis and the accuracy of the elevation analysis can also be made to a desired degree.

In general, the larger the noise, the lower the coherence. Therefore, the amount of noise can be grasped from the components of the coherence matrix. Accordingly, when the displacement analysis/elevation analysis unit 109 shown in FIGS. 19 to 22 further converts the component of the coherence matrix into displacement or elevation, taking into account the amount of noise obtained from the components of the coherence matrix, the accuracy of the displacement analysis and the accuracy of the elevation analysis can be further improved.

Each component in each of the above example embodiments may be configured with a single piece of hardware, but can also be configured with a single piece of software. Alternatively, the components may be configured with a plurality of pieces of hardware or a plurality of pieces of software. Further, part of the components may be configured with hardware and the other part with software.

The functions (processes) in the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 23:
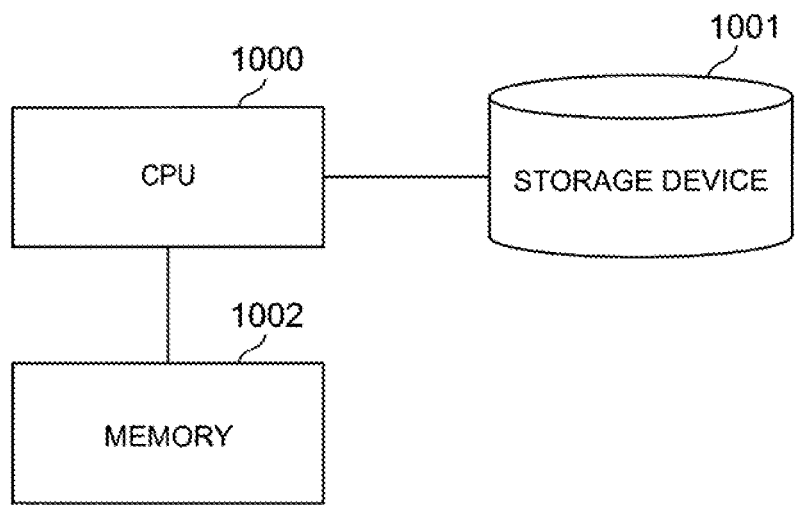
FIG. 23 It depicts a block diagram showing an example of a computer with a CPU.

FIG. 23 is a block diagram showing an example of a computer having a CPU. The computer is implemented in an image processing device. The CPU 1000 executes processing in accordance with a program stored in a storage device 1001 to realize the functions in the above example embodiments. That is to say, the functions of the phase specifying unit 101, the clustering units 102, 110, the coherence matrix calculation unit 103, the intensity calculation unit 104, the neighboring pixel extraction unit 105, the similarity verification unit 106, the pixel connection unit 107, the noise estimation unit 108 and the displacement analysis/elevation analysis unit 109 in the image processing devices shown in FIGS. 1, 10, 15, 17, 19 to 22.

The storage device 1001 is, for example, a non-transitory computer readable media. The non-transitory computer readable medium is one of various types of tangible storage media. Specific examples of the non-transitory computer readable media include a magnetic storage medium (for example, flexible disk, magnetic tape, hard disk), a magneto-optical storage medium (for example, magneto-optical disc), a compact disc-read only memory (CD-ROM), a compact disc-recordable (CD-R), a compact disc-rewritable (CD-R/W), and a semiconductor memory (for example, a mask ROM, a programmable ROM (PROM), an erasable PROM (EPROM), a flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 24:
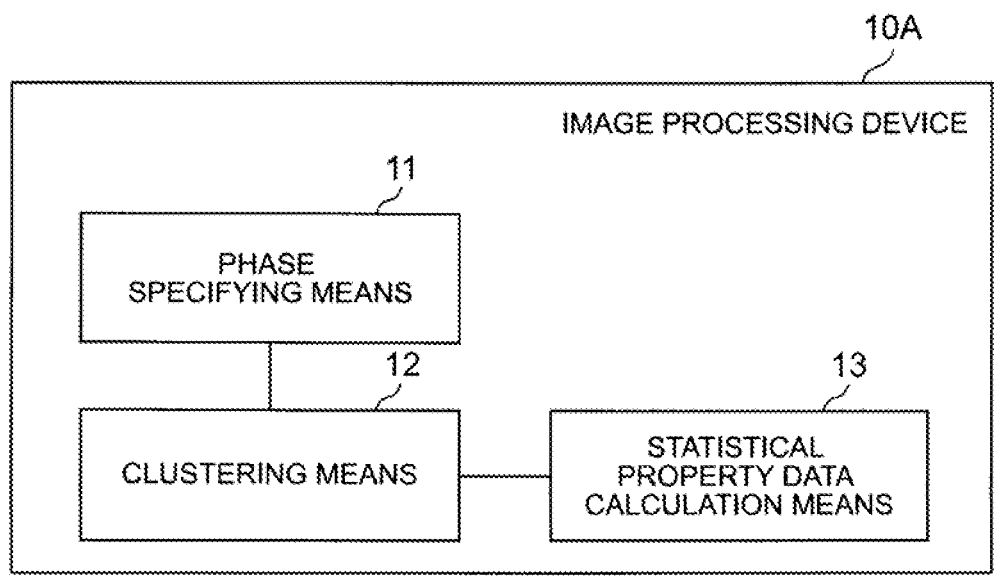
FIG. 24 It depicts a block diagram showing the main part of an image processing unit.

FIG. 24 is a block diagram showing the main part of the image processing device. The image processing device 10A shown in FIG. 24 comprises phase specifying means 11 (in the example embodiments, realized by a phase specifying unit 101) for specifying a phase of a sample pixel from a plurality of SAR images, clustering means 12 (in the example embodiments, realized by the clustering unit 102 or the clustering unit 110) for generating a plurality of clusters by clustering the sample pixels based on correlation of phases of a pair of the sample pixels in the SAR image, and phase statistic data calculation means 13 (in the example embodiments, realized by the coherence matrix calculation unit 103) for calculating phase statistic data capable of grasping a phase statistic regarding the pixel for each of the clusters.

Figure 25:
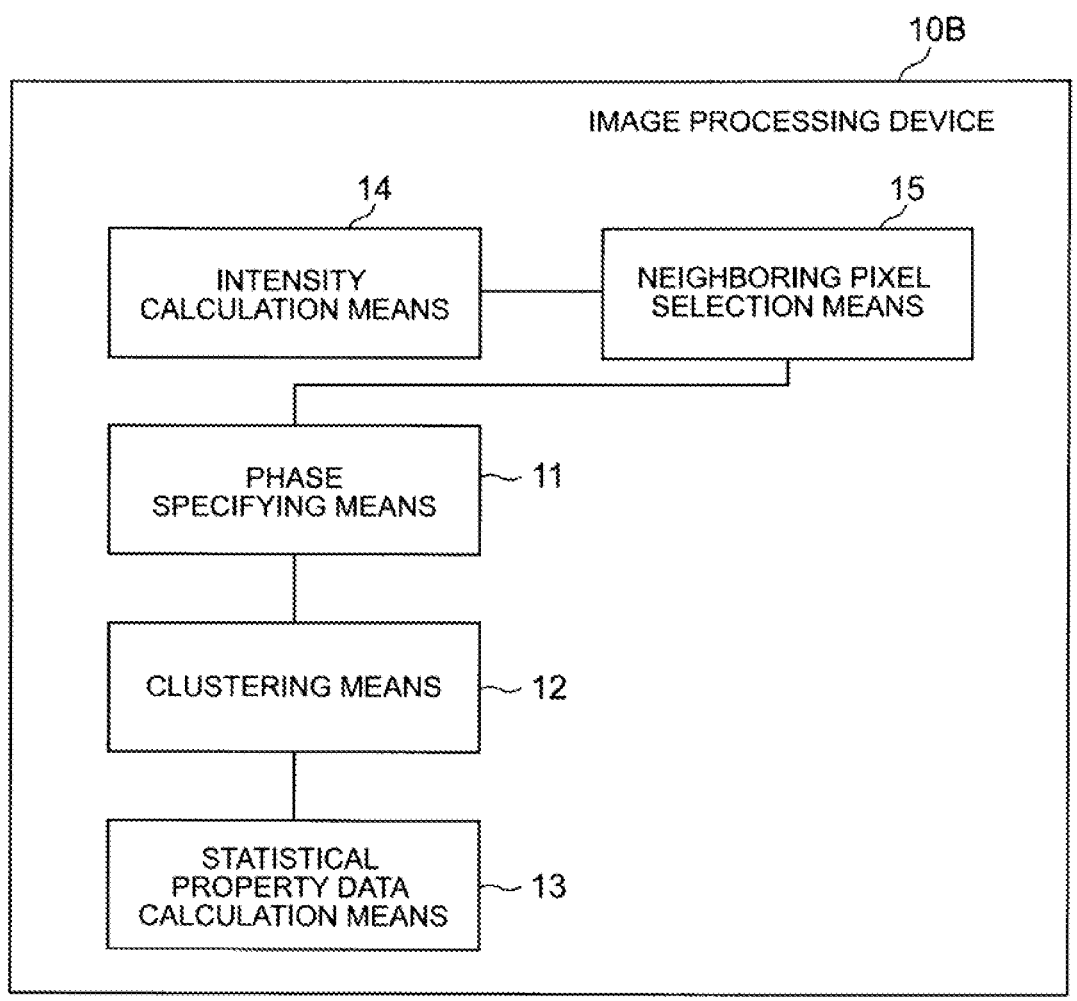
FIG. 25 It depicts a block diagram showing the main part of another type of an image processing unit.

FIG. 25 is a block diagram showing a main part of another image processing device. The image processing device 10B shown in FIG. 25 further comprising intensity calculation means 14 (in the example embodiments, realized by the intensity calculation unit 104) for calculating intensity of the sample pixel, and neighboring pixel selection means 15 (in the example embodiments, realized by the neighboring pixel extraction unit 105 and the similarity verification unit 106) for selecting a neighboring pixel that has a similar statistical property of intensity to the sample pixel, based on the intensity of the sample pixel, wherein the phase specifying means 11 also specifies the phase of the selected neighboring pixel.

A part of or all of the above example embodiments may also be described as, but not limited to, the following supplementary notes.

(Supplementary note 1) An image processing device comprising:
phase specifying means for specifying a phase of a sample pixel from a plurality of SAR images,
clustering means for generating a plurality of clusters by clustering the sample pixels based on correlation of phases of a pair of the sample pixels in the SAR image, and
phase statistic data calculation means for calculating phase statistic data capable of grasping a phase statistic regarding the pixel for each of the clusters.

(Supplementary note 2) The image processing device according to Supplementary note 1, wherein
the data capable of grasping a phase statistic is represented by coherent matrix.

(Supplementary note 3) The image processing device according to Supplementary note 1 or 2, further comprising
intensity calculation means for calculating intensity of the sample pixel, and
neighboring pixel selection means for selecting neighboring pixels that have a similar statistical property of intensity to the sample pixel, based on the intensity of the sample pixel,
wherein
the phase specifying means also specifies the phases of the selected neighboring pixels.

(Supplementary note 4) The image processing device according to Supplementary note 3, further comprising
pixel connecting means (in the example embodiments, realized by the pixel connecting part 107) for connecting the neighboring pixels having a similar statistical property to graph them,
wherein
the clustering means generates the clusters by cutting edges between the pixels whose phase correlation is less than or equal to a predetermined threshold in a graph generated by the pixel connecting means.

(Supplementary note 5) The image processing device according to Supplementary note 3 or 4, further comprising
noise estimation means (in the example embodiments, realized by the noise estimation unit 108) for estimating the statistical property of noise of the neighboring pixel,
wherein
the clustering means performs the clustering with reference to the statistical property of the noise.

(Supplementary note 6) The image processing device according to any one of Supplementary notes 1 to 5, further comprising
displacement analysis means for converting the data calculated by the phase statistic data calculation means into a displacement of a ground surface and analyzing the displacement of the ground surface.

(Supplementary note 7) The image processing device according to any one of Supplementary notes 1 to 5, further comprising
elevation analysis means for converting the data calculated by the phase statistic data calculation means into an elevation and analyzing the elevation.

(Supplementary note 8) An image processing method comprising:
specifying a phase of a sample pixel from a plurality of SAR images,
generating a plurality of clusters by clustering the sample pixels based on correlation of phases of a pair of the sample pixels in the SAR image, and
calculating phase statistic data capable of grasping a phase statistic regarding the pixel for each of the clusters.

(Supplementary note 9) The image processing method according to Supplementary note 8, wherein
the data capable of grasping a phase statistic is represented by coherent matrix.

(Supplementary note 10) The image processing method according to Supplementary note 8 or 9, further comprising
calculating intensity of the sample pixel,
selecting neighboring pixels that have a similar statistical property of intensity to the sample pixel, based on the intensity of the sample pixel, and
specifying the phases of the selected neighboring pixels too.

(Supplementary note 11) The image processing method according to Supplementary note 10, further comprising
connecting the neighboring pixels having the similar statistical property to graph them, and
generating clusters by cutting edges between the pixels whose phase correlation is less than or equal to a predetermined threshold in a generated graph.

(Supplementary note 12) The image processing method according to Supplementary note 10 or 11, further comprising
estimating a statistical property of noise of the neighboring pixel, and
performing the clustering with reference to the statistical property of the noise.

(Supplementary note 13) An image processing program causing a computer to execute:
a process of specifying a phase of a sample pixel from a plurality of SAR images,
a process of generating a plurality of clusters by clustering the sample pixels based on correlation of phases of a pair of the sample pixels in the SAR image, and
a process of calculating phase statistic data capable of grasping a phase statistic regarding the pixel for each of the clusters.

(Supplementary note 14) The image processing program according to Supplementary note 13, causing the computer to further execute
a process of calculating intensity of the sample pixel,
a process of selecting neighboring pixels that have a similar statistical property of intensity to the sample pixel, based on the intensity of the sample pixel, and
a process of specifying the phases of the selected neighboring pixels too.

(Supplementary note 15) The image processing program according to Supplementary note 14, causing the computer to further execute
a process of connecting the neighboring pixels having the similar statistical property to graph them, and
a process of generating clusters by cutting edges between the pixels whose phase correlation is less than or equal to a predetermined threshold in a generated graph.

(Supplementary note 16) The image processing program according to Supplementary note 14 or 15, causing the computer to further execute a process of estimating a statistical property of noise of the neighboring pixel, and a process of performing the clustering with reference to the statistical property of the noise.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST 1, 2, 3, 4, 5, 10A, 10B, 21, 31, 41, 51 Image processing device
11 Phase specifying means
12 Clustering means
13 Phase statistic data calculation means
14 Intensity calculation means
15 Neighboring pixel selection means
100 SAR image storage unit
101 Phase specifying unit
102, 110 Clustering unit
103 Coherence matrix calculation unit
104 Intensity calculation unit
105 Neighboring pixel extraction unit
106 Similarity verification unit
107 Pixel connection unit
108 Noise estimation unit
109 Displacement analysis/elevation analysis unit
1000 CPU
1001 Storage device
1002 Memory

What is claimed is:

1. An image processing device comprising:
a memory storing software instructions, and
one or more processors configured to execute the software instructions to
specify a phase of a sample pixel from a plurality of Synthetic Aperture Radar (SAR) images,
generate a plurality of clusters by clustering the sample pixels based on correlation of phases of a pair of the sample pixels in the SAR image, and
calculate phase statistic data capable of grasping a phase statistic regarding the pixel for each of the clusters.

2. The image processing device according to claim 1, wherein
the data capable of grasping a phase statistic is represented by coherent matrix.

3. The image processing device according to claim 1, wherein
the one or more processors are configured to further execute the software instructions to
calculate intensity of the sample pixel, and
select neighboring pixels that have a similar statistical property of intensity to the sample pixel, based on the intensity of the sample pixel, and
wherein
the one or more processors are configured to execute the software instructions to also specify the phases of the selected neighboring pixels.

4. The image processing device according to claim 3, wherein
the one or more processors are configured to further execute the software instructions to
connect the neighboring pixels having the similar statistical property to graph them, and
wherein
the one or more processors are configured to execute the software instructions to generate the clusters by cutting edges between the pixels whose phase correlation is less than or equal to a predetermined threshold in a generated graph.

5. The image processing device according to claim 3, wherein
the one or more processors are configured to further execute the software instructions to
estimate a statistical property of noise of the neighboring pixel,
wherein
the one or more processors are configured to execute the software instructions to perform the clustering with reference to the statistical property of the noise.

6. The image processing device according to claim 1, wherein
the one or more processors are configured to further execute the software instructions to
convert the calculated data into a displacement of a ground surface and analyzes the displacement of the ground surface.

7. The image processing device according to claim 1, wherein
the one or more processors are configured to further execute the software instructions to
convert the calculated data into an elevation and analyzes the elevation.

8. An image processing method comprising:
specifying a phase of a sample pixel from a plurality of Synthetic Aperture Radar (SAR) images,
generating a plurality of clusters by clustering the sample pixels based on correlation of phases of a pair of the sample pixels in the SAR image, and
calculating phase statistic data capable of grasping a phase statistic regarding the pixel for each of the clusters.

9. The image processing method according to claim 8, wherein
the data capable of grasping a phase statistic is represented by coherent matrix.

10. The image processing method according to claim 8, further comprising
calculating intensity of the sample pixel,
selecting neighboring pixels that have a similar statistical property of intensity to the sample pixel, based on the intensity of the sample pixel, and
specifying the phases of the selected neighboring pixels too.

11. The image processing method according to claim 10, further comprising
connecting the neighboring pixels having the similar statistical property to graph them, and
generating clusters by cutting edges between the pixels whose phase correlation is less than or equal to a predetermined threshold in a generated graph.

12. The image processing method according to claim 10, further comprising
estimating a statistical property of noise of the neighboring pixel, and
performing the clustering with reference to the statistical property of the noise.

13. A non-transitory computer readable recording medium storing an image processing program which, when executed by a processor, performs:

specifying a phase of a sample pixel from a plurality of Synthetic Aperture Radar (SAR) images, generating a plurality of clusters by clustering the sample pixels based on correlation of phases of a pair of the sample pixels in the SAR image, and calculating phase statistic data capable of grasping a phase statistic regarding the pixel for each of the clusters.

14. The non-transitory computer readable recording medium according to claim 13, wherein when executed by the processor, the program further performs calculating intensity of the sample pixel, selecting neighboring pixels that have a similar statistical property of intensity to the sample pixel, based on the intensity of the sample pixel, and specifying the phases of the selected neighboring pixels too.

15. The non-transitory computer readable recording medium according to claim 14, wherein when executed by the processor, the program further performs connecting the neighboring pixels having the similar statistical property to graph them, and generating clusters by cutting edges between the pixels whose phase correlation is less than or equal to a predetermined threshold in a generated graph.

16. The non-transitory computer readable recording medium according to claim 14, wherein when executed by the processor, the program further performs estimating a statistical property of noise of the neighboring pixel, and performing the clustering with reference to the statistical property of the noise.

* * * * *